(12) United States Patent
Kim et al.

(10) Patent No.: US 11,112,953 B2
(45) Date of Patent: Sep. 7, 2021

(54) METHOD FOR STORING IMAGE AND ELECTRONIC DEVICE THEREOF

(71) Applicant: Samsung Electronics Co., Ltd., Gyeonggi-do (KR)

(72) Inventors: Joong Seob Kim, Seoul (KR); Dongkyung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 312 days.

(21) Appl. No.: 15/399,181

(22) Filed: Jan. 5, 2017

(65) Prior Publication Data

US 2017/0192654 A1 Jul. 6, 2017

(30) Foreign Application Priority Data

Jan. 5, 2016 (KR) .......................... 10-2016-0000961

(51) Int. Cl.
*G06F 3/0488* (2013.01)
*G06F 3/0484* (2013.01)
(Continued)

(52) U.S. Cl.
CPC ........ *G06F 3/04845* (2013.01); *G06F 3/0346* (2013.01); *G06F 3/0484* (2013.01);
(Continued)

(58) Field of Classification Search
CPC .. G06F 3/04883; G06F 3/0488; G06F 3/0484; G06F 3/04845; G06F 3/0346;
(Continued)

(56) References Cited

U.S. PATENT DOCUMENTS

| 8,187,104 B2 * | 5/2012 | Pearce ................... A63F 13/10 463/43 |
| 8,827,814 B2 * | 9/2014 | Lemay ................ G07F 17/3218 463/42 |

(Continued)

FOREIGN PATENT DOCUMENTS

| CN | 103455315 | 12/2013 |
| CN | 103473012 | 12/2013 |

(Continued)

OTHER PUBLICATIONS

European Search Report dated Apr. 26, 2018 issued in counterpart application No. 17150417.8-1221, 6 pages.

(Continued)

*Primary Examiner* — Dino Kujundzic
(74) *Attorney, Agent, or Firm* — The Farrell Law Firm, P.C.

(57) ABSTRACT

Disclosed is a method of an electronic device including outputting an image through a display according to running of an application, receiving at least one of information on a state and an external situation of the electronic device while the image is output, determining, based on at least one of the information on the state and the external situation of the electronic device, whether at least one of the state and the external situation of the electronic device corresponds to a designated condition for storing at least part of the output image, and storing at least part of the output image based on the determination.

14 Claims, 18 Drawing Sheets

(51) Int. Cl.
    *G06F 11/34*     (2006.01)
    *G06F 11/30*     (2006.01)
    *G06F 9/451*     (2018.01)
    *G06F 3/0346*     (2013.01)
    *G06T 1/60*     (2006.01)

(52) U.S. Cl.
CPC ........ *G06F 3/0488* (2013.01); *G06F 3/04883* (2013.01); *G06F 9/451* (2018.02); *G06F 11/30* (2013.01); *G06F 11/3013* (2013.01); *G06F 11/3055* (2013.01); *G06F 11/3058* (2013.01); *G06F 11/3438* (2013.01); *G06T 1/60* (2013.01)

(58) Field of Classification Search
CPC ............... G06F 9/451; G06F 11/30; G06F 2203/04808; G06T 1/60; H04L 67/22; H04N 5/232933
See application file for complete search history.

(56) References Cited

U.S. PATENT DOCUMENTS

| | | | |
|---|---|---|---|
| 9,063,803 | B1 | 6/2015 | Lewkovilz |
| 9,071,830 | B2 | 6/2015 | Okada et al. |
| 9,779,389 | B2* | 10/2017 | Thapliyal ............... G06Q 10/10 |
| 2003/0182399 | A1* | 9/2003 | Silber ................ G06F 16/9535 |
| | | | 709/219 |
| 2007/0248316 | A1 | 10/2007 | Kim |
| 2010/0115417 | A1 | 5/2010 | Cox et al. |
| 2012/0166921 | A1* | 6/2012 | Alexandrov .......... G06F 17/212 |
| | | | 715/202 |
| 2012/0183271 | A1* | 7/2012 | Forutanpour .......... H04N 5/772 |
| | | | 386/224 |
| 2012/0204153 | A1* | 8/2012 | Peterson ............. G06F 11/3672 |
| | | | 717/124 |
| 2012/0236154 | A1 | 9/2012 | Schaff |
| 2013/0227471 | A1* | 8/2013 | Cha ....................... G06F 9/4416 |
| | | | 715/790 |
| 2014/0032735 | A1* | 1/2014 | Kapoor ................. G06F 3/1454 |
| | | | 709/224 |
| 2014/0155022 | A1* | 6/2014 | Kandregula ........... G06Q 50/01 |
| | | | 455/405 |
| 2015/0229849 | A1 | 8/2015 | Shin |
| 2015/0277571 | A1* | 10/2015 | Landau ............... G06F 3/04842 |
| | | | 715/863 |
| 2015/0294433 | A1 | 10/2015 | Ye et al. |
| 2015/0326655 | A1 | 11/2015 | Quan et al. |
| 2016/0098334 | A1* | 4/2016 | Hariharakrishnan ........................ G06F 11/3013 |
| | | | 702/186 |
| 2016/0139777 | A1* | 5/2016 | Pinho .................. G06F 3/04845 |
| | | | 715/771 |
| 2016/0210013 | A1* | 7/2016 | Park ...................... G06F 3/0488 |
| 2016/0313883 | A1 | 10/2016 | Zhang |

FOREIGN PATENT DOCUMENTS

| | | |
|---|---|---|
| CN | 104850350 | 8/2015 |
| CN | 104885107 | 9/2015 |
| CN | 104978117 | 10/2015 |
| CN | 105117134 | 12/2015 |
| KR | 1020070058585 | 6/2007 |
| KR | 100854814 | 8/2008 |
| KR | 1020140074498 | 6/2014 |
| WO | WO 2006/085703 | 8/2006 |
| WO | WO 2015/032190 | 3/2015 |

OTHER PUBLICATIONS

International Search Report dated Mar. 22, 2017 Issued in counterpart application No. PCT/KR2017/000117, 8 pages.
European Search Report dated May 12, 2017 Issued in counterpart application No. 17150417.8-1879, 9 pages.
Chinese Office Action dated Nov. 4, 2019 issued in counterpart application No. 201710007221.5, 23 pages.
European Search Report dated Sep. 19, 2019 issued in counterpart application No. 17150417.8-1221, 8 pages.
European Search Report dated Jul. 17, 2020 issued in counterpart application No. 17150417.8-1203, 7 pages.
Chinese Office Action dated Aug. 5, 2020 issued in counterpart application No. 201710007221.5, 17 pages.
Chinese Office Action dated Nov. 27, 2020 issued in counterpart application No. 201710007221.5, 15 pages.
Christian Keur et al., "IOS Programming", Jan. 31, 2015, 11 pages.
Indonesian Examination Report dated Feb. 11, 2021 issued in counterpart application No. 201805682, 6 pages.
CN Decision of Rejection dated Mar. 26, 2021 issued in counterpart application No. 201710007221.5, 16 pages.

* cited by examiner

METHOD FOR STORING IMAGE AND ELECTRONIC DEVICE THEREOF

PRIORITY

This application claims priority under 35 U.S.C. § 119(a) to a Korean Patent Application, which was filed in the Korean Intellectual Property Office on Jan. 5, 2016 and assigned Serial No. 10-2016-0000961, contents of which are incorporated herein by reference.

BACKGROUND

1. Field of the Disclosure

The present disclosure relates generally to an electronic device, and more particularly, to a method of controlling an operation for storing an image with the electronic device.

2. Description of the Related Art

Running an application using an electronic device and storing an image of a currently running program conventionally requires that a start or end function for storing an image be executed. For example, to store an image of the application or a screen shot, an explicit start or end command must be executed, which is an inconvenience to the user.

Indeed, executing an explicit start or end function to store an image may be extremely difficult to perform in some cases, such as when a user is absorbed in a game using an electronic device. As such, there is a need in the art for a more convenient and user-friendly method for storing an image in the electronic device.

SUMMARY

Aspects of the present disclosure are to address at least the above-mentioned problems and/or disadvantages and to provide at least the advantages described below.

Accordingly, an aspect of the present disclosure is to provide a convenient image storing process, by omitting unnecessary steps in the storing of an image.

According to an aspect of the present disclosure, an operation method of an electronic device includes outputting an image through a display according to running of an application, receiving information on at least one of a state of the electronic device and an external situation of the electronic device while the image is output, determining, based on at least one of the information on the state of the electronic device and the external situation of the electronic device, whether at least one of the state of the electronic device and the external situation of the electronic device corresponds to a designated condition for storing at least part of the output image, and storing at least part of the output image based on the determination.

According to another aspect of the present disclosure, an electronic device includes a display, a memory, a microphone, an input unit, a sensor module; and at least one processor that is connected to the display, the memory, the microphone, the input unit, and the sensor module, wherein the at least one processor may output an image through the display according to the running of an application, receive at least one of information on a state of the electronic device and information on an external situation of the electronic device while the image is output, determine, based on at least one of the information on the state of the electronic device and the information on the external situation of the electronic device, whether at least one of the state of the electronic device and the external situation of the electronic device corresponds to a designated condition for storing at least part of the output image, and store at least part of the output image in the memory at least based on the determination.

According to another aspect of the present disclosure, an electronic device includes a memory and a processor, wherein the processor may run an application including at least part of game content, may identify at least one user input or frames per second on the game content through the application, and may record the at least part of the game content in the memory when the input or frames per second satisfies a designated condition.

According to another aspect of the present disclosure, an electronic device includes an input unit, an interface configured to perform communication with an external electronic device, and a controller, wherein the controller may determine a time to store an image based on an input through the input unit, may generate a command signal to store an image when the time to store the image is determined, and may transmit the generated command signal to the external electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
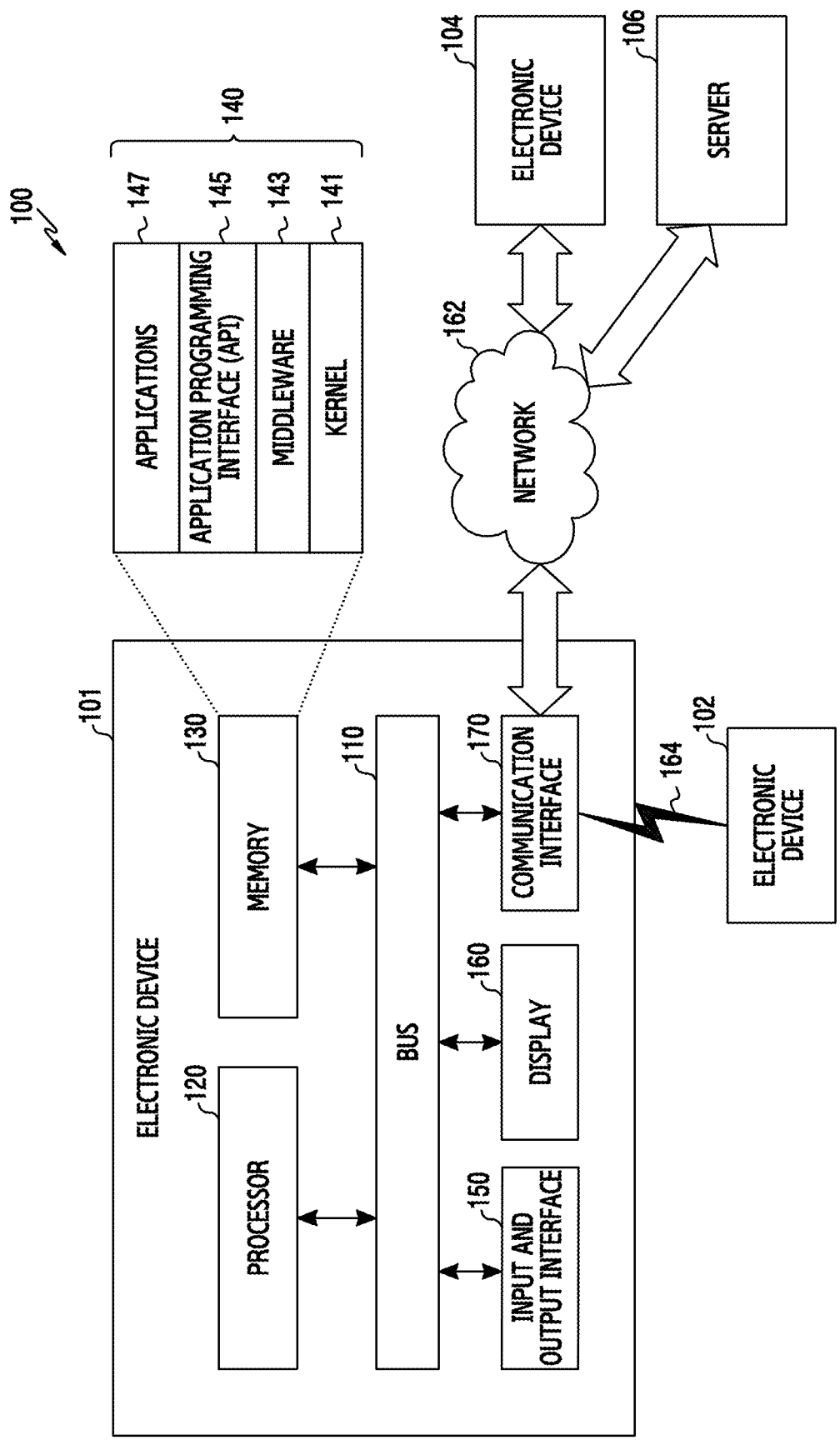
FIG. 1 illustrates a network environment including an electronic device according to embodiments of the present disclosure.

Hereinafter, embodiments of the present disclosure will be described with reference to the accompanying drawings. However, it should be understood that there is no intent to limit the present disclosure to the particular forms disclosed herein. Rather, the present disclosure should be construed to cover various modifications, equivalents, and/or alternatives of embodiments of the present disclosure. In describing the drawings, similar reference numerals may be used to designate similar constituent elements, and a detailed description of known functions and/or configurations will be omitted for the sake of clarity and conciseness.

As used herein, the expressions "have", "may have", "include", and "may include" refer to the existence of a corresponding feature, such as a numeral, function, operation, or constituent element, and do not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in embodiments of the present disclosure may modify various components regardless of the order and/or the importance but do not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element, such as a first element, is referred to as being (operatively or communicatively) "connected," or "coupled," to another element, such as a second element, the first element may be directly connected or coupled to the second element or another element, such as a third element, may be interposed between the first and second elements. In contrast, it may be understood that when the first element is referred to as being "directly connected," or "directly coupled" to the second element, there is no third element interposed therebetween.

The expression "configured to" used in the present disclosure may be used interchangeably with "suitable for", "having the capacity to", "designed to", "adapted to", "made to", or "capable of" according to the situation. The expression "configured to" may not necessarily imply "specifically designed to" in hardware. In some situations, the expression "device configured to" may indicate that the device, together with other devices or components, "is able to". For example, the phrase "processor adapted (or configured) to perform A, B, and C" may indicate an embedded processor only for performing the corresponding operations or a generic-purpose processor, such as a central processing unit (CPU) or application processor (AP) that can perform the corresponding operations by executing one or more software programs stored in a memory device.

The terms herein are used merely for the purpose of describing particular embodiments and are not intended to limit the scope of other embodiments of the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even the terms defined in the present disclosure should not be exclusively interpreted.

An electronic device according to embodiments of the present disclosure may include at least one of a smart phone, a tablet personal computer (PC), a mobile phone, a video phone, an electronic book reader (e-book reader), a desktop PC, a laptop PC, a netbook computer, a workstation, a server, a Personal Digital Assistant (PDA), a portable multimedia player (PMP), a motion pictures experts group (MPEG)-1 audio layer-3 (MP3) player, a mobile medical device, a camera, and a wearable device such as an accessory type including a watch, a ring, a bracelet, an anklet, a necklace, a glasses, a contact lens, or a head-mounted device (HMD), a fabric or clothing integrated type, such as electronic clothing, a body-mounted type, such as a skin pad, or tattoo, and a bio-implantable type, such as an implantable circuit.

According to some embodiments, the electronic device may be a home appliance including at least one of a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box, such as Samsung HomeSync™, Apple TV™, or Google TV™), a game console, such as Xbox™ and PlayStation™), an electronic dictionary, an electronic key, a camcorder, and an electronic photo frame.

According to another embodiment, the electronic device may include at least one of various medical devices, such as a blood glucose monitoring device, a heart rate monitoring device, a blood pressure measuring device, and a body temperature measuring device, a magnetic resonance angiography (MRA) device, a magnetic resonance imaging (MRI) device, a computed tomography (CT) machine, and an ultrasonic machine, a navigation device, a global positioning system (GPS) receiver, an event data recorder (EDR), a flight data recorder (FDR), a vehicle infotainment device, an electronic device for a ship, such as a navigation device and a gyro-compass, avionics, security devices, an automotive head unit, a robot for home or industry, an automated teller machine (ATM), point of sales (POS) device, or Internet of things (IoT) device, such as a light bulb, various sensors, electric or gas meter, a sprinkler device, a fire alarm, a thermostat, a streetlamp, a toaster, a sporting goods, a hot water tank, a heater, and a boiler.

According to some embodiments, the electronic device may include at least one of a part of furniture or a building/structure, an electronic board, an electronic signature receiving device, a projector, and various types of measuring instruments, such as a water, electric, gas, and radio wave meter. The electronic device according to embodiments of the present disclosure may be a combination of one or more of the aforementioned various devices and may be a flexible device. The electronic device is not limited to the aforementioned devices, and may include a new electronic device according to the development of new technology.

As used herein, the term "user" may indicate a person who uses an electronic device or an artificial intelligence electronic device that uses an electronic device.

FIG. 1 illustrates a network environment including an electronic device according to embodiments of the present disclosure.

Specifically, an electronic device 101 within a network environment 100 will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include a circuit for connecting the elements 110-170 and transferring communication, such as control messages and/or data, between the elements.

The processor 120 may include one or more of a central processing unit (CPU), an application processor (AP), and a communication processor (CP). The processor 120 may perform operations or data processing relating to control and/or communication of at least one other element of the electronic device 101.

The memory 130 may include a volatile memory and/or a non-volatile memory, may store instructions or data relevant to at least one other element of the electronic device 101, and may store software and/or a program 140 such as a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources used for performing an operation or function implemented by the other programs. The kernel 141 may provide an interface through which the middleware 143, the API 145, or the applications 147 may access the individual elements of the electronic device 101 to control or manage the system resources.

The middleware 143 may function as an intermediary for enabling the API 145 or the applications 147 to communicate with the kernel 141 to exchange data.

In addition, the middleware 143 may process one or more operation requests received from at least one of the applications 147 according to priority. For example, the middleware 143 may give priority to use the system resources of the electronic device 101 to at least one of the applications 147, and may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include at least one interface or function for file control, window control, image processing, or text control.

The input/output interface 150 may transfer instructions or data input from a user or another external device to the other element(s) of the electronic device 101. The input/output interface 150 may output the instructions or data received from the other element(s) of the electronic device 101 to the user or another external device.

The display 160 may include a liquid crystal display (LCD), a light emitting diode (LED) display, an organic light emitting diode (OLED) display, a micro electro mechanical system (MEMS) display, or an electronic paper display. The display 160 may display various types of content for the user, such as text, images, videos, icons, or symbols. The display 160 may include a touch screen and receive a touch, gesture, proximity, or hovering input using an electronic pen or the user's body part.

The communication interface 170 may set communication between the electronic device 101 and an external device, such as the first external electronic device 102, the second external electronic device 104, or the server 106, and may be connected to a network 162 through wireless or wired communication to communicate with the external device.

The wireless communication may use at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol.

In addition, the wireless communication may include short range communication 164 which may be performed by using at least one of Wi-Fi, Bluetooth®, Bluetooth low energy (BLE), near field communication (NFC), and global navigation satellite system (GNSS). The GNSS may include at least one of a global positioning system (GPS), a global navigation satellite system (Glonass), a Beidou navigation satellite system (Beidou), and a European global satellite-based navigation system (Galileo), according to a use area, a bandwidth, or the like. Hereinafter, in the present disclosure, the "GPS" may be interchangeably used with the "GNSS". The wired communication may include at least one of a universal serial bus (USB), a high definition multimedia interface (HDMI), recommended standard 232 (RS-232), and a plain old telephone service (POTS). The network 162 may include at least one of a communication network such as a computer network, such as a local area network (LAN) or a wide area network (WAN), the Internet, and a telephone network.

Each of the first and second external electronic apparatuses 102 and 104 may be of a type identical to or different from that of the electronic apparatus 101. According to an embodiment, the server 106 may include a group of one or more servers, and all or some of the operations performed in the electronic device 101 may be performed in another electronic device or a plurality of electronic devices.

According to an embodiment, when the electronic device 101 has to perform some functions or services automatically or in response to a request, the electronic device 101 may make a request for performing at least some functions relating thereto to another device instead of performing the functions or services by itself or in addition to the another device. Another electronic apparatus may execute the requested functions or the additional functions, and may deliver a result of the execution to the electronic apparatus 101, which may process the received result as it is or additionally to provide the requested functions or services. To achieve this, cloud, distributed, or client-server computing technology may be used.

Figure 2:
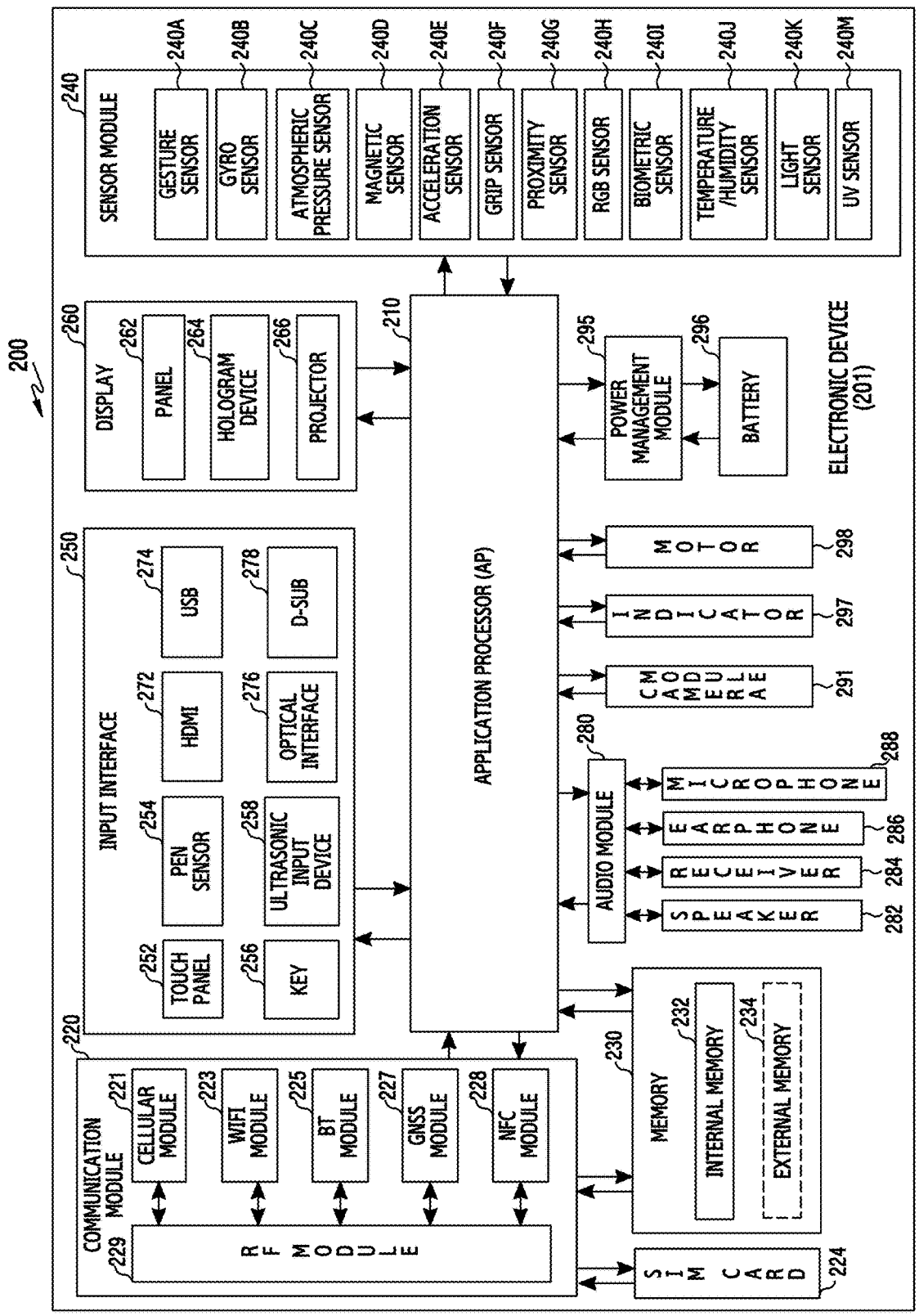
FIG. 2 is a block diagram of an electronic device according to embodiments of the present disclosure.

FIG. 2 is a block diagram illustrating an electronic device according to embodiments of the present disclosure.

Referring to FIG. 2, the electronic apparatus 201 may include all or part of the electronic apparatus 101 illustrated in FIG. 1. The electronic device 201 may include at least one processor, such as application processor (AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an application program and perform processing of various pieces of data and calculations. The processor 210 may be implemented by a system on chip (SoC) and may further include a graphic processing unit (GPU) and/or an image signal processor. The processor 210 may include at least one of the elements illustrated in FIG. 2. The processor 210 may load, into a volatile memory, instructions or data received from at least a non-volatile memory of the other elements, process the loaded instructions or data, and store various data in a non-volatile memory.

The communication module 220 may have the same or a similar configuration to that of the communication interface 170 of FIG. 1 and may include a cellular module 221, a Wi-Fi module 223, a Bluetooth (BT) module 225, a GNSS module 227, such as a GPS, Glonass, Beidou, or Galileo module, an NFC module 228, and a radio frequency (RF) module 229.

The cellular module 221 may provide a voice call, image call, a text message service, or an Internet service through a communication network. According to an embodiment, the cellular module 221 may distinguish between and authenticate electronic devices 201 within a communication network using the SIM card 224, may perform at least some of the functions that the processor 210 may provide, and may include a communication processor (CP).

Each of the Wi-Fi module 223, the BT module 225, the GNSS module 227, and the NFC module 228 may include a processor for processing data transmitted and received through the relevant module. According to some embodiments of the present disclosure, at least two of the cellular module 221, the Wi-Fi module 223, the BT module 225, the GNSS module 227, and the NFC module 228 may be included in one integrated chip (IC) or IC package.

The RF module 229 may transmit/receive an RF signal and may include a transceiver, a power amplifier module (PAM), a frequency filter, a low noise amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module (SIM) card 224 may include a card including a subscriber identity module and/or an embedded SIM, and may contain unique identification information, such as an integrated circuit card identifier (ICCID) or subscriber information, such as an international mobile subscriber identity (IMSI).

The memory 230 may include an internal memory 232 or an external memory 234. The embedded memory 232 may include at least one of a volatile memory, such as a dynamic random access memory (DRAM), a static RAM (SRAM), or a synchronous dynamic RAM (SDRAM), and a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a flash memory, such as a NAND flash memory or a NOR flash memory, a hard disc drive, or a solid state drive (SSD).

The external memory 234 may further include a flash drive a compact flash (CF), a secure digital (SD), a micro secure digital (Micro-SD), a mini secure digital (Mini-SD), an extreme Digital (xD), or a memory stick, and may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red/green/blue (RGB) sensor, a bio-sensor 240I, a temperature/humidity sensor 240J, a light sensor 240K, and an ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include a touch panel 252, a (digital) pen sensor 254, a key 256, and an ultrasonic input device 258. The touch panel 252 may use at least one of a capacitive, resistive, infrared, and ultrasonic type, and may further include a control circuit. The touch panel 252 may further include a tactile layer and provide a tactile reaction to the user.

The (digital) pen sensor 254 may include a recognition sheet which is a part of the touch panel or is separated from the touch panel. The key 256 may include a physical button, an optical key or a keypad. The ultrasonic input device 258 may detect ultrasonic wavers generated by an input tool through a microphone 288 and identify data corresponding to the detected ultrasonic waves.

The display 260 may include a panel 262, a hologram device 264 or a projector 266. The panel 262 may include a configuration that is identical or similar to the display 160 illustrated in FIG. 1 and may be implemented to be flexible, transparent, or wearable. The panel 262 and the touch panel 252 may be implemented as one module. The hologram 264 may display a three dimensional image in the air by using an interference of light. The projector 266 may display an image by projecting light onto a screen, which may be located inside or outside the electronic apparatus 201. According to an embodiment, the display 260 may further include a control circuit for controlling the panel 262, the hologram device 264, or the projector 266.

The interface 270 may include a high-definition multimedia interface (HDMI) 272, a universal serial bus (USB) 274, an optical interface 276, or a D-subminiature (D-sub) 278, and may be included in the communication interface 170 illustrated in FIG. 1. Additionally or alternatively, the interface 270 may include a mobile high-definition link (MHL) interface, a secure digital (SD) card/multi-media card (MMC) interface, or an infrared data association (IrDA) standard interface.

The audio module 280 may bilaterally convert a sound and an electrical signal. At least some elements of the audio module 280 may be included in the input/output interface 145 illustrated in FIG. 1. The audio module 280 may process sound information which is input or output through a speaker 282, a receiver 284, earphones 286, or the microphone 288.

The camera module 291 may photograph a still image and a dynamic image, and may include one or more of a front sensor and a back sensor, a lens, an image signal processor (ISP) or a flash, such as a light-emitting diode (LED) or xenon lamp.

The power management module 295 may manage power of the electronic device 201 and may include a power management integrated circuit (PMIC), a charger integrated circuit (IC), or a battery gauge. The PMIC may use a wired and/or wireless charging method. Examples of the wireless charging method may include a magnetic resonance, magnetic induction, and electromagnetic method. Additional circuits, such as a coil loop, a resonance circuit, or a rectifier, for wireless charging may be further included. The battery gauge may measure a residual quantity of the battery 296, and a voltage, a current, or a temperature during the charging, and may include a rechargeable or solar battery.

The indicator 297 may display a particular state, such as a booting, message, or charging state, of part or all of the electronic apparatus 201. The motor 298 may convert an electrical signal into mechanical vibration, and may generate a vibration or a haptic effect, for example. The electronic apparatus 201 may include a GPU for supporting a mobile TV, which may process media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to embodiments of the present disclosure may include at least one of the aforementioned elements. Some elements may be omitted or additional elements may be further included in the electronic device. Some of the hardware components according to embodiments may be combined into one entity, which may perform functions identical to those of the relevant components before the combination.

Figure 3:
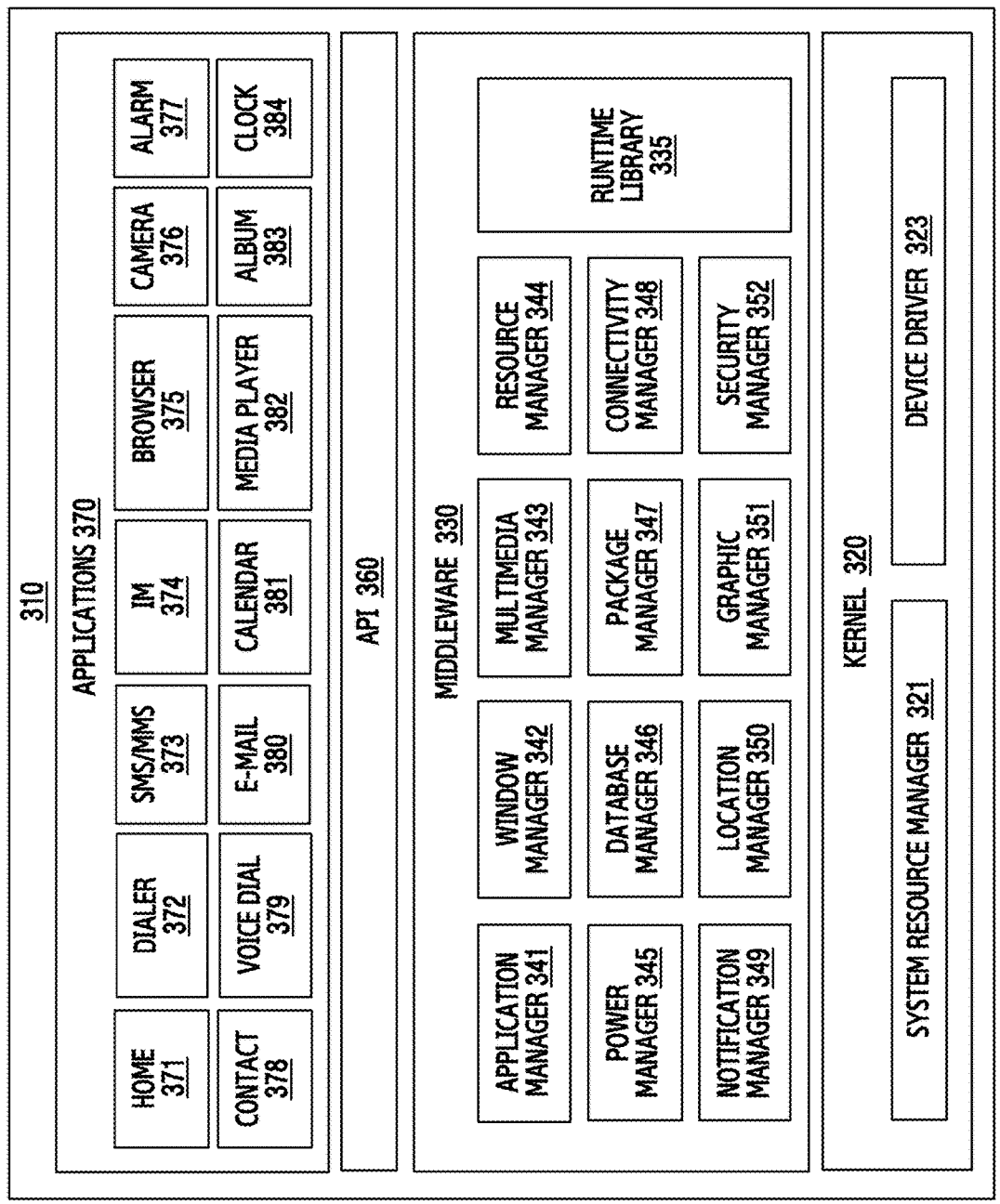
FIG. 3 is a block diagram of a program module according to embodiments of the present disclosure.

FIG. 3 is a block diagram of a program module according to embodiments of the present disclosure.

According to an embodiment, the program module 310 may include an operating system (OS) for controlling resources related to the electronic device and/or various applications executed in the OS, which may be Android, iOS, Windows, Symbian, Tizen, or Bada, for example.

The program module 310 may include a kernel 320, middleware 330, an API 360, and/or an applications 370. At least some of the program module 310 may be preloaded on the electronic apparatus, or may be downloaded from an external electronic apparatus.

The kernel 320 may include a system resource manager 321 and/or a device driver 323. The system resource manager 321 may perform the control, allocation, or retrieval of system resources and may include a process manager, a memory manager, or a file system manager. The device driver 323 may include a display driver, a camera driver, a Bluetooth driver, a shared memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, or the functionality for an arithmetic function, for example.

The application manager 341 may manage the life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, and a storage space of at least one of the applications 370.

The power manager 345 may operate together with a basic input/output system (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as Wi-Fi or Bluetooth. The notification manager 349 may display or notify of an event, such as an arrival message, an appointment, and a proximity notification, in a manner that does not disturb the user. The location manager 350 may manage location information of the electronic apparatus. The graphic manager 351 may manage a graphic effect, which is to be provided to the user, or a user interface related to the graphic effect. The security manager 352 may provide various security functions required for system security and user authentication, for example. According to an embodiment of the present disclosure, when the electronic apparatus has a telephone call function, the middleware 330 may further include a telephony manager for managing a voice call function or a video call function of the electronic apparatus.

The middleware 330 may include a middleware module that forms a combination of various functions of the above-described elements, may provide a module specialized for each type of OS in order to provide a differentiated function, and may dynamically delete some of the existing elements or may add new elements.

The API 360 is a set of API programming functions, and may be provided with a different configuration according to an OS. For example, in the case of Android or iOS, one API set may be provided for each platform. In the case of Tizen, two or more API sets may be provided for each platform.

The applications 370 may include one or more applications which can provide functions such as home 371, dialer 372, short message service/multimedia messaging service (SMS/MMS) 373, instant message (IM) 374, browser 375, camera 376, alarm 377, contacts 378, voice dialer 379, email 380, calendar 381, media player 382, album 383, clock 384, health care, such as for measuring exercise quantity or blood sugar level, or environment information, such as atmospheric pressure, humidity, or temperature information.

According to an embodiment of the present disclosure, the applications 370 may include an information exchange application supporting information exchange between the electronic apparatus and an external electronic apparatus. The application associated with information exchange may include a notification relay application for forwarding specific information to an external electronic device, or a device management application for managing an external electronic device.

For example, the notification relay application may include a function of delivering, to the external electronic apparatus, notification information generated by other applications of the electronic apparatus 101. The notification relay application may receive notification information from an external electronic device and provide the received notification information to a user.

The device management application may install, delete, or update a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device, such as a telephone call service or a message service.

According to an embodiment, the applications 370 may include a health care application of a mobile medical appliance designated according to attributes of the external electronic device 102 or 104, may include an application received from the external electronic apparatus, and may include a preloaded application or a third party application which can be downloaded from the server. Names of the elements of the program module 310, according to the above-described embodiments of the present disclosure, may vary depending on the type of OS.

According to embodiments of the present disclosure, at least some of the program module 310 may be implemented in software, firmware, hardware, or a combination of at least two thereof. At least some of the program module 310 may be implemented (i.e., executed) by the processor. At least some of the program module 310 may include a module, a program, a routine, a set of instructions, and/or a process for performing one or more functions.

The term "module" as used herein may indicate a unit including one or a combination of at least two of hardware, software, and firmware. The "module" may be interchangeably used with the terms "unit", "logic", "logical block", "component", or "circuit". The "module" may be a minimum unit of an integrated component element or a part thereof, may be a minimum unit for performing one or more functions or a part thereof, and may be mechanically or electronically implemented. For example, the "module" according to the present disclosure may include at least one of an application-specific integrated circuit (ASIC) chip, a field-programmable gate arrays (FPGA), and a programmable-logic device for performing operations which are known or are to be developed hereinafter.

The module or the program module herein may include one or more elements described above, exclude some of them, or further include other elements. The operations performed by the module, the program module, or other elements, according to embodiments, may be executed in a sequential, parallel, iterative, or heuristic method. In addition, some operations may be executed in a different order, or may be omitted, or other operations may be added. In addition, the embodiments disclosed in the present document are intended for the explanation and understanding of the technical matter, and shall not limit the scope of the technology described in the present document. Accordingly, the scope of the present disclosure should be construed to encompass all modifications or various other embodiments based on the technical concept of the present disclosure.

In addition, the embodiments disclosed in the present document are intended for the explanation and understanding of the disclosed technical matter, and shall not limit the scope of embodiments of the present document. Therefore, the scope of embodiments of the present document should be construed to encompass all modifications or various other embodiments based on the technical concept of the embodiments of the present disclosure.

Figure 4:
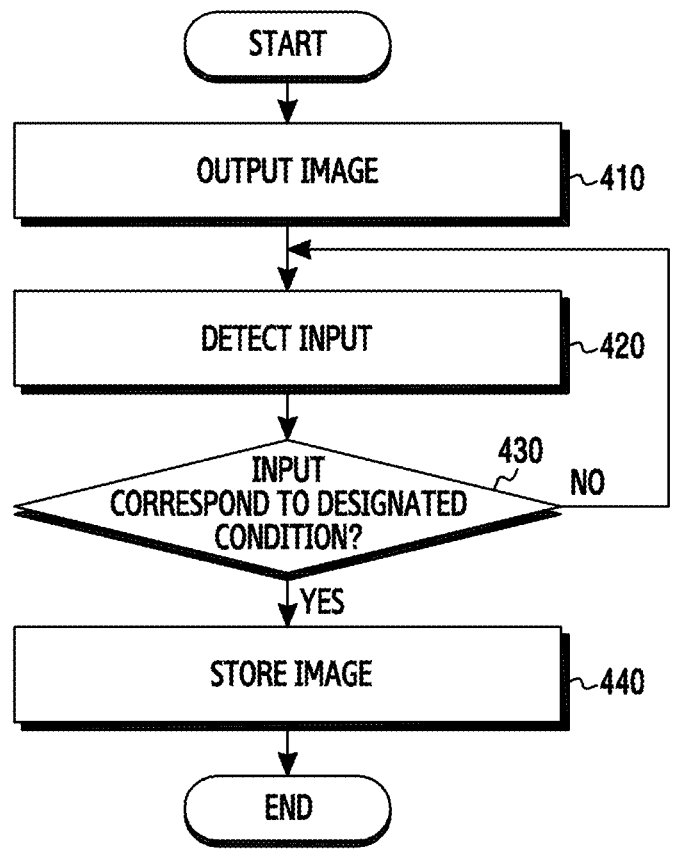
FIG. 4 illustrates a method for storing an image according to an embodiment of the present disclosure.

FIG. 4 illustrates a method for storing an image according to an embodiment of the present disclosure.

Referring to FIG. 4, in step 410, an electronic device may output an image through a display according to the running of an application. When a user input is received, the electronic device may run the application and may output an image related to the run application. For example, as a user input is received, the electronic device may run a video application, an image viewer application, or a game application and may output an image of the run application.

In step 420, the electronic device may detect an input to receive at least one of information on a state of the electronic device and information on an external situation of the electronic device while the image is output in step 410. The information on the state of the electronic device may include information necessary to implement the application among obtainable input information, such as application execution information and information on the inside of the application. The information on the external situation of the electronic device may include information other than the information necessary to implement the application among the input information obtainable by the electronic device, such as reception information on the electronic device and information on the outside of the application.

Information on an internal state of the electronic device may include the information necessary to implement the application and information measurable during the implementation of the application among the input information obtainable by the electronic device. The information necessary to implement the application and the information measurable during the implementation of the application may include at least one of a touch input, a key input, frames per second (FPS) information, and chatting input information. In an example, the electronic device may receive a touch input through a touch screen or key input information through a physical input device, may receive FPS information related to internal graphic throughput of the electronic device, or may receive input information related to chatting.

The information on the external situation of the electronic device may include at least one of biometric input information and motion input information on a user. In an example, the electronic device may receive the biometric input information on the user through an biometric sensor of the electronic device, may receive information on a sound generated by the user through a microphone of the electronic device, may receive input information on a motion of the user using a gyro sensor or an accelerometer, and may receive information on an external situation from an external controller such as a keyboard or a peripheral. The peripheral may include a device to control driving, a musical instrument, a device functioning as a musical instrument, sports equipment, or the like.

In step 430, the electronic device may determine whether input information received in step 420 corresponds to a designated condition, such as by determining whether detected input information corresponds to a condition which varies depending on the type of detected input information. According to embodiments, to determine whether the detected input information corresponds to the designated condition, the electronic device performs the following: When the detected input information is touch input information, the electronic device may determine whether the number of touch inputs detected during a unit of time is greater than or equal to a designated number. When the detected input information is input information on a biometric state of the user, the electronic device may determine whether a state of the detected biometric input information corresponds to a designated state. When biometric input information on the heartbeat of the user is detected, the electronic device may determine whether the heart rate is greater than or equal to a designated number. When biometric input information on the pupils of the user is detected, the electronic device may determine whether the size of the pupils is greater than or equal to a designated size. When the detected input information is input information on motion information, the electronic device may determine whether the detected motion information is greater than or equal to a designated motion value. When the detected input information is an input on FPS, the electronic device may determine whether an FPS value is less than a designated value. For example, when processing power is insufficient, the electronic device may determine whether an FPS value that is reduced by an increase in screen updating is less than a designated value. When the detected input information is an input on FPS, the electronic device may determine whether an FPS value increased during a unit of time is greater than or equal to a designated value. For example, when processing power is sufficient, the electronic device may determine whether an FPS value that is increased by an increase in screen updating is greater than or equal to a designated value.

If the input in step 430 does not correspond to the designated condition, the method returns to step 420.

In step 440, the electronic device may store the image. The electronic device may store at least part of the output image when the electronic device determines in step 430 that at least one of the information on the state of the electronic device and the information on the external situation of the electronic device corresponds to a designated condition for storing at least part of the output image.

The electronic device according to the embodiment of the present disclosure may store at least part of the output image, while the image is output according to the running of the application, when at least one of the information on the state of the electronic device and the information on the external situation of the electronic device corresponds to at least one condition among when greater than or equal to a designated number of touch inputs are detected, when a biometric information value of greater than or equal to a designated value is detected, when greater than or equal to a designated quantity of chatting inputs is detected, when a user motion value of greater than or equal to a designated value is detected, and when an FPS value of less than a designated value is detected.

According to embodiments of the present disclosure, the electronic device may begin to store at least part of the output image when at least one of the state of the electronic device and the external situation of the electronic device corresponds to the designated condition.

The electronic device may begin to store at least part of the output image when at least one of the state of the electronic device and the external situation of the electronic device corresponds to the designated condition, and may stop storing the at least part of the output image when at least one of the state of the electronic device and the external situation of the electronic device does not correspond to the designated condition.

When the at least one of the state of the electronic device and the external situation of the electronic device corresponds to the designated condition, the electronic device may store information on an input detected at the corresponding time and information on a state of the electronic device at the corresponding time. The information on the detected input may include information on the type of the input, the form of the input, the number of inputs, the time at which the input is detected, and the time for which the detected input is maintained. The information on the state of the electronic device may include information on internal data throughput of the electronic device and information on an application run in the electronic device.

Figure 5:
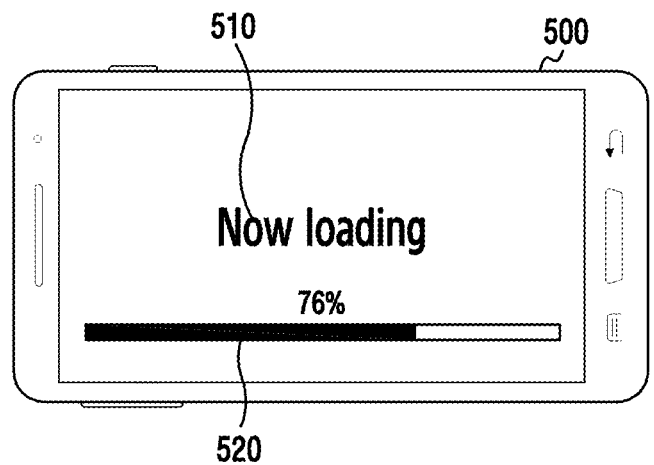
FIG. 5 illustrates an image displayed in an electronic device when at least one of a state and an external situation of the electronic device does not correspond to a designated condition according to embodiments of the present disclosure.

FIG. 5 illustrates an image displayed in the electronic device when at least one of the state and the external situation of the electronic device does not correspond to the designated condition according to embodiments of the present disclosure.

An image displayed in the electronic device when at least one of the state and the external situation of the electronic device corresponds to the designated condition may be an image displayed when the image is determined to be relatively more significant or important for the user than an image output at another time. On the contrary, an image displayed in the electronic device when at least one of the state and the external situation of the electronic device corresponding to the designated condition is not detected may be an image displayed when the image is determined to be relatively insignificant or less important for the user.

The image displayed in the electronic device when at least one of the state and the external situation of the electronic device does not correspond to the designated condition may be a loading image that displays the loading of data from a memory to start an application, an image repeated for a certain period of time, and an image displayed when at least one of the time in which no input is detected, the state of the electronic device, and the external situation of the electronic device does not correspond to a designated condition.

FIG. 5 illustrates an example of a loading image as one example of an image displayed when at least one of the state and the external situation of the electronic device received by the electronic device does not correspond to the designated condition. An electronic device 500 may need a certain period of loading time to start an application from the time when a user input to run an application is received to the time the application starts. Loading time may indicate the time for a processor of an electronic device to invoke a necessary file from a memory in order to start an application. As illustrated in FIG. 5, the electronic device 500 may display a phrase 510 of "now loading" or a loading status 520 in a visual manner during the loading time.

The user may not perform an input for manipulating the application or may perform an input regardless of the manipulation of the application during the loading time. The electronic device may detect that the current state of the electronic device is a loading status when a phrase related to loading (for example, 510) is displayed on the screen or an indication related to loading (for example, 520) is detected. According to one embodiment, the electronic device may not store an image displayed during the loading time when it is determined that no input is detected during the loading time to start the application or at least one of the state and the external situation of the electronic device does not correspond to a designated value. According to another embodiment, when the loading time is detected, the electronic device may not store an image even though an input is detected.

Figure 6:
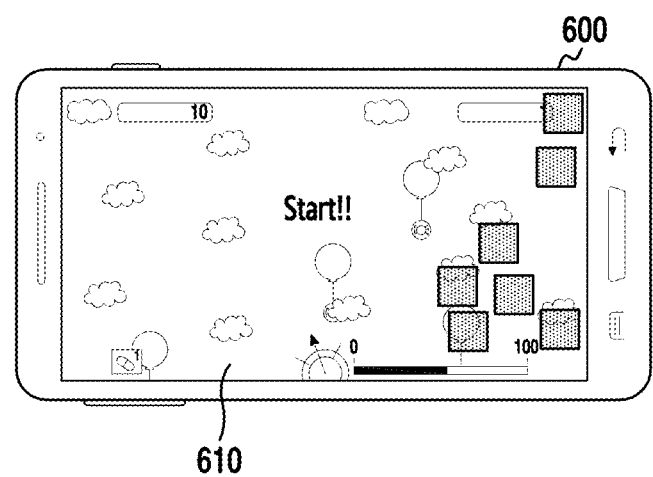
FIG. 6 illustrates an image displayed in an electronic device when at least one of a state and an external situation of the electronic device corresponds to the designated condition according to embodiments of the present disclosure.

FIG. 6 illustrates an image displayed in the electronic device when at least one of the state and the external situation of the electronic device corresponds to the designated condition according to embodiments of the present disclosure.

An image displayed in the electronic device when at least one of the state and the external situation of the electronic device corresponds to the designated condition may be an image displayed when the image is determined to be relatively more significant or important for the user than an image at another time.

FIG. 6 is an example of an image output when at least one of the state and the external situation of the electronic device corresponds to the designated condition. An image 610 in FIG. 6 is an example of an image displayed when at least one of the information on the state of the electronic device and the information on the external situation of the electronic device corresponds to the designated condition in step 430 of FIG. 4.

According to embodiments, the image displayed when at least one of the state and the external situation of the electronic device corresponds to the designated condition may include an image displayed when a touch input corresponds to a designated condition, an image displayed when a biometric information input corresponds to a designated condition, an image displayed when a chatting information input corresponds to a designated condition, an image displayed when a motion information input corresponds to a designated condition, and an image displayed when an FPS value corresponds to a designated condition.

The image displayed when at least one of the state and the external situation of the electronic device corresponds to the designated condition is characterized as including at least one of an image at the time any of a screen configuration is changed from a designated condition, the number of components forming a screen exceeds a designated condition.

According to one embodiment of the present disclosure, when an image is output as the user runs a game application, an image at a time corresponding to a designated condition may include an image at the time of any of clearing a specific point of a game, the number of characters appearing in the game exceeds a designated condition, a specific item or specific character appears in an image, a new background is provided, a character performs a specific operation, or when a score or a specific phrase is displayed.

Figure 7:
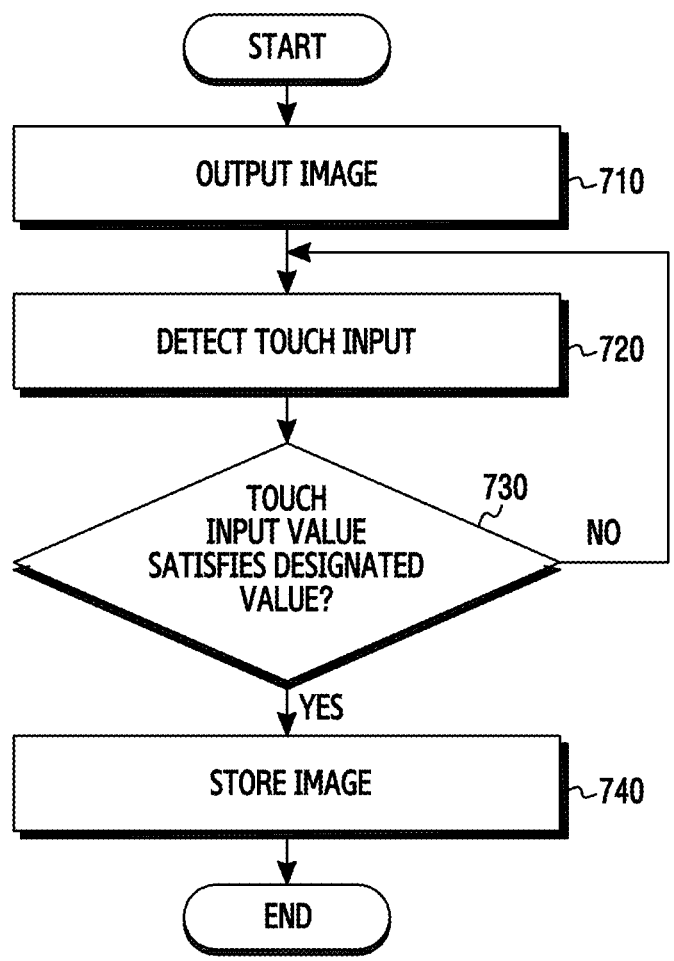
FIG. 7 illustrates an image storing procedure according to a touch input according to embodiments of the present disclosure.

FIG. 7 illustrates an image storing procedure according to a touch input according to embodiments of the present disclosure.

In step 710, an electronic device may output an image according to the reception of a user input for image output, such as an input for running an application. For example, the electronic device may output an image at least based on a user input for running a video, image viewer, or game application.

In step 720, the electronic device may detect a touch input by the user through a touch screen of the electronic device. The touch input may be performed for the user to manipulate an application while the application is running on the electronic device, and may be made by a user's touch, drag, press for a certain period of time, or tap. The electronic device may calculate the number of touch inputs, such as through a tap, a touch input pattern, the quantity of touches input per unit of time, such as the time of touches through a tap or drag, to determine a touch input value.

The electronic device may detect not only a touch input but also an input through another electronic device attached or connected to the electronic device in another embodiment of the present disclosure. For example, the electronic device may detect an input through at least one of a keyboard, a mouse, and an input-enabled electronic device, which are connected to the electronic device, and may determine whether the detected input corresponds to a designated condition.

In step 730, the electronic device may determine whether a value of the detected touch input corresponds to (i.e., satisfies) a designated value. In examples of this determination, the electronic device may determine whether the number of touch inputs at a specific time the application is running is greater than or equal to a designated value. The electronic device may determine whether the touch input pattern corresponds to a designated condition. The electronic device may determine whether the time at which the touch input is detected corresponds to a designated condition.

The electronic device may receive information on the number of key inputs, a key input pattern, and key input time, which are detected by another electronic device connected to the electronic device, from the other electronic device, and may determine through the received information whether an input value is greater than or equal to a designated value.

When it is determined that the detected touch input corresponds to a designated condition in step 730, the electronic device may store at least part of an image displayed when the touch input corresponds to the designated condition in step 740. According to embodiments, the electronic device may begin to store the at least part of the image from the time the value of the touch input corresponds to the designated value. The electronic device may store at least part of an image displayed from the time the value of the touch input corresponds to the designated value to the time the value of the touch input does not correspond to the designated value, such as the time the input of a touch is stopped or the value of the detected touch input corresponds to the designated value. The electronic device may store at least part of an image displayed from the time the value of the touch input corresponds to the designated value to the time the application is ended. The electronic device may store at least part of an image displayed from the time the touch input corresponds to the designated condition to the time the user inputs an explicit storage end command.

When the electronic device stores an application execution image in a video form, the electronic device may also store information on an image, a sound, and vibrations of the run application, or may store the application execution image in a screen shot form.

According to another embodiment of the present disclosure, the electronic device may store detection information on the time touch input information corresponds to a designated value. The detection information may include at least one of time when the touch input information corresponds to the designated value, input information on the time the touch input information corresponds to the designated value, and information on internal data throughput of the electronic device. The detection information may be stored in a file form along with the image or in a metafile form separately from the image.

When it is determined that the touch input value does not satisfy the designated value, the method returns to step 720.

Figure 8:
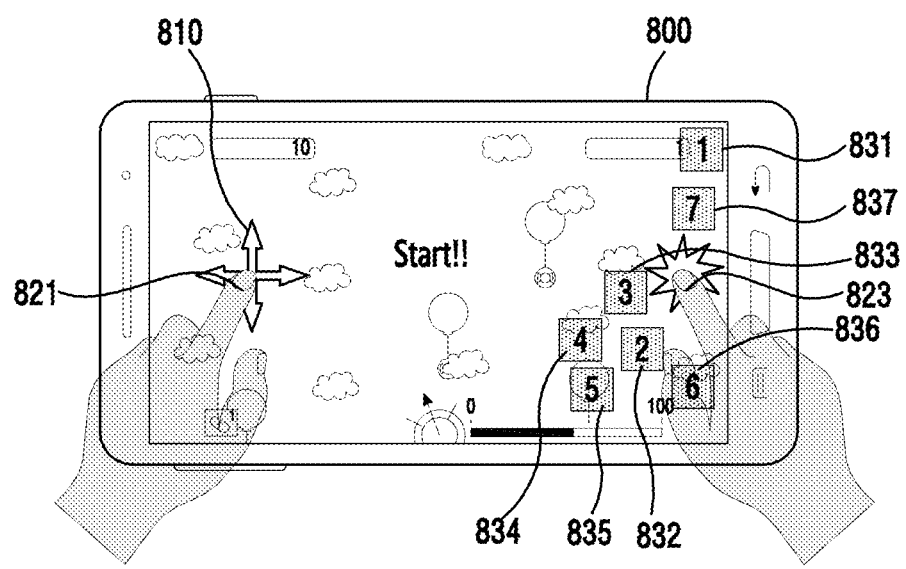
FIG. 8 illustrates a screen displayed according to a touch input in an electronic device according to embodiments of the present disclosure.

FIG. 8 illustrates a screen displayed according to a touch input in an electronic device according to embodiments of the present disclosure.

FIG. 8 is an example illustrating that the electronic device 800 performs the procedure illustrated in FIG. 7. When the electronic device 800 outputs an image in step 710 of FIG. 7, the electronic device 800 may output an image 810. When the user performs touches 821 and 823, the electronic device 800 may detect inputs 831, 832, 833, 834, 835, 836, and 837 according to the touches 821 and 823. Detecting the touch inputs as illustrated in FIG. 8 may correspond to an operation of the electronic device 800 detecting the touch input in step 720 of FIG. 7. When the number of inputs 831, 832, 833, 834, 835, 836, and 837 according to the touches 821 and 823 or the quantity of inputs during a unit of time corresponds to a designated condition, the electronic device 800 may store the currently displayed image 810, which may correspond to steps 730 and 740 illustrated in FIG. 7.

Figure 9:
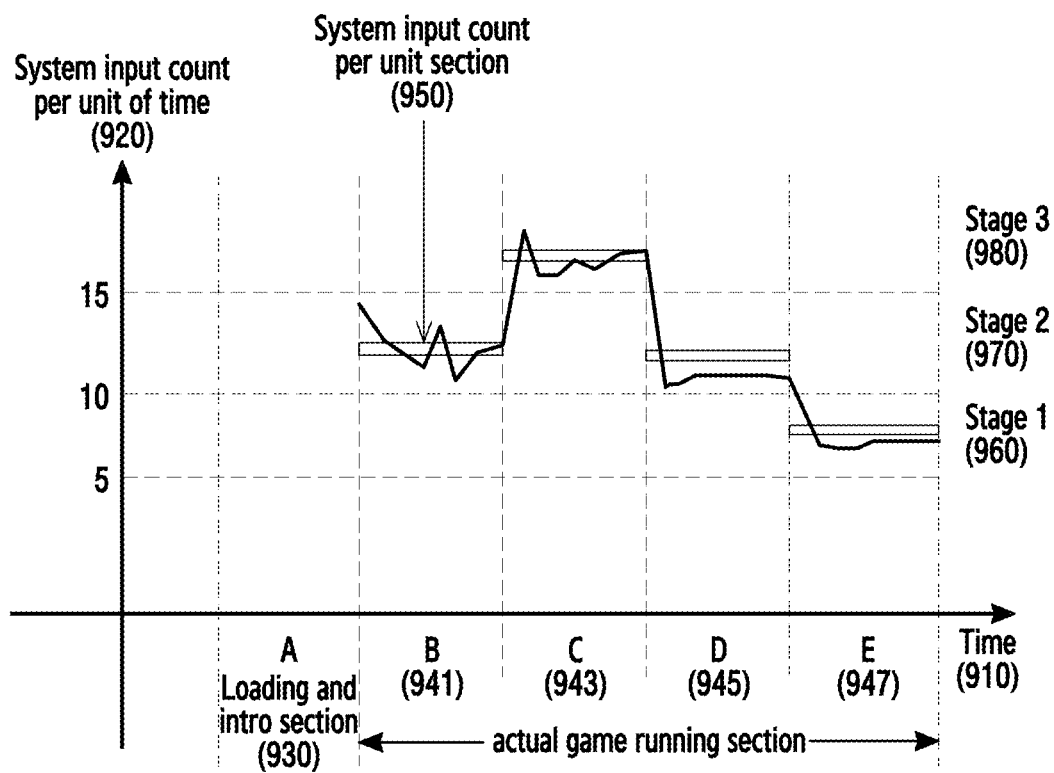
FIG. 9 illustrates an input according to the application running time in an electronic device according to embodiments of the present disclosure.

FIG. 9 illustrates an input according to application running time in an electronic device according to embodiments of the present disclosure.

FIG. 9 illustrates a graph representing the number of touch inputs according to image output time when the electronic device detects the touch input in step 720 of FIG. 7. In the example of FIG. 9, an image may be output according to the running of a game application. The horizontal axis in FIG. 9 may represent time 910 according to the running of the application, and the vertical axis in FIG. 9 may represent a system input count 920 according to a touch input. The horizontal axis in FIG. 9 may be divided into sections according to a criterion, such as a loading and intro section A 930, and an actual application running section, which includes sections B 941, C 943, D 945, and E 947.

Each unit section may be configured to include at least one or more units of time. Accordingly, the horizontal axis in FIG. 9 may be divided into sections A 930, B 941, C 943, D 945, and E 947 according to a unit of time. The electronic device may set levels 960, 970, and 980 according to a system input count in order to determine whether the value of the touch input corresponds to the designated value in step 730 of FIG. 7. For example, the electronic device may define the instances when the number of touch inputs per unit of time is greater than or equal to 5 and less than 10 as stage 1 960, is greater than or equal to 10 and less than 15 as stage 2 970, and is greater than or equal to 15 as stage 3 980.

In order to determine whether the value of the detected touch input corresponds to the designated value, the electronic device may use the average of system input counts per unit of time measured in a unit section, or the peak value of system input counts per unit of time measured in a unit section. For example, the electronic device may determine whether the average of system input counts 950 in each unit section is in the range of each of the stages 960, 970, and 980. Alternatively, the electronic device may determine whether the peak value of system input counts per unit of time measured in a unit section is in the range of each of the stages 960, 970, and 980. When the electronic device uses the average of touch inputs detected during a unit of time to determine whether the value of the touch input corresponds to the designated value, each stage according to a unit section in FIG. 9 is illustrated in Table 1, as follows.

TABLE 1

| Unit section | Stage |
| --- | --- |
| A | None |
| B | Stage 2 |
| C | Stage 3 |
| D | Stage 2 |
| E | Stage 1 |

As illustrated in Table 1, and in correspondence with FIG. 9, a stage in which the system input count per unit of time is 0 is defined as no stage, a stage in which the system input count per unit of time is greater than or equal to 5 and less than 10, as stage 1 960 at unit section E, a stage in which the system input count per unit of time is greater than or equal to 10 and less than 15, as stage 2 970 at unit sections B and D, and a stage in which the system input count per unit of time is greater than or equal to 15, as stage 3 980 at unit section C. Referring to section B 941 in Table 1, since the average of system input counts per unit of time ranges between 10 to 15, section B 941 may correspond to stage 2 970 in which the system input count per unit of time is greater than or equal to 10 and less than 15.

The electronic device may determine whether to store an image according to a stage of each section. For example, when a stage corresponding to stage 2 970 is set as a designated value to store an image, the electronic device may store an image in section B 941. Alternatively, when a stage corresponding to stage 3 980 is set as a designated value to store an image, the electronic device may store an image in section C 943.

According to embodiments, when the electronic device stores an image displayed from the time the value of the touch input is greater than or equal to the designated value to the time the value of the touch input does not correspond to the designated value, if stage 2 970 is a designated reference value, the electronic device may store an image from section B 941 to section D 945. If stage 3 980 is the designated value, the electronic device may store an image in section C 943. When the electronic device stores an image displayed from the time the value of the touch input is greater than or equal to the designated value to the time the output of the image is ended, if stage 2 970 is a designated value, the electronic device may store an image from section B 941 to section E 947. If stage 3 980 is the designated value, the electronic device may store an image from section C 943 to section E 947.

Figure 10:
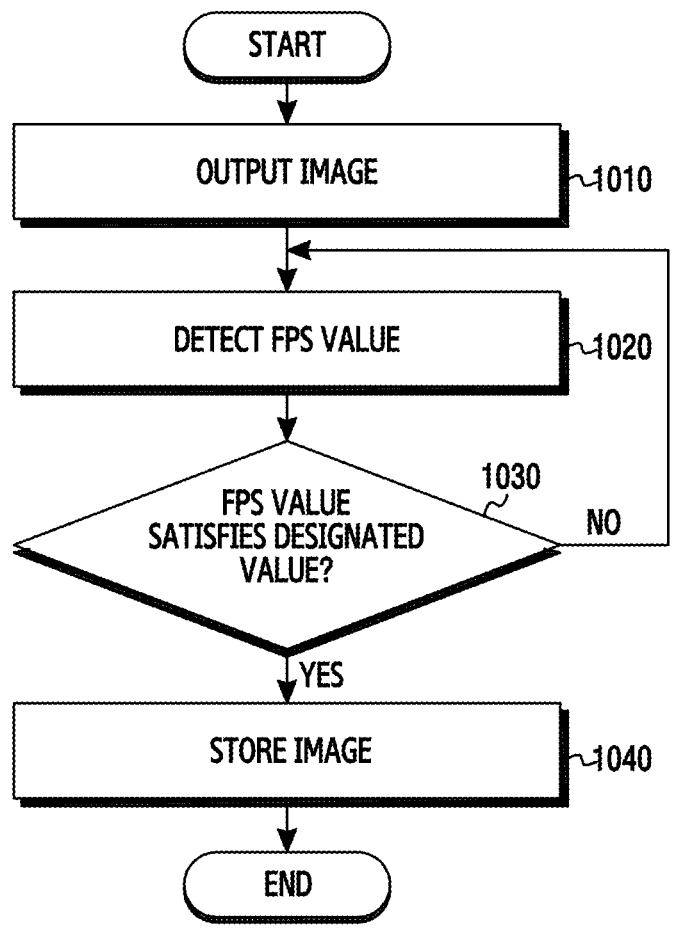
FIG. 10 illustrates an image storing procedure according to the frames per unit of time according to embodiments of the present disclosure.

FIG. 10 illustrates an image storing procedure according to frames per unit of time according to embodiments of the present disclosure.

In step 1010, an electronic device may output an image according to the reception of a user input for image output, such as an input for running an application. For example, the electronic device may output an image at least based on a user input for running a video application, an image viewer application, or a game application.

In step 1020, the electronic device may detect an FPS value, such as an FPS input value of a running application and an FPS input value actually updated on a display of the electronic device. The FPS value is an example of input information received from the inside of the electronic device.

In step 1030, the electronic device may determine whether the detected FPS input value corresponds to a designated value, such as by determining whether an FPS input value at a specific time the application runs is less than or equal to the designated value. In order to determine whether FPS input information corresponds to the designated value, the electronic device may use a difference between the time the electronic device requests a processor for graphic processing to perform an operation to generate an application image and the time the processor processes the operation for the application to complete and store an image in a frame buffer.

For example, when an FPS value that the processor updates on the display to process an image in an FPS level of the application is less than the designated value, that is, when the processor has a relatively high throughput, the electronic device may determine that the FPS input information corresponds to the designated condition. Alternatively, when the FPS value that the processor updates on the display to process an image in the FPS level of the application is greater than the designated value, that is, when the processor has a relatively low throughput, the electronic device may determine that the FPS value does not correspond to the designated condition.

When it is determined that the detected FPS value corresponds to the designated condition in step 1030, the electronic device may store at least part of an image at the time the FPS value corresponds to the designated condition. According to embodiments, the electronic device may begin to store the at least part of the output image when the FPS value corresponds to the designated condition, and may store the at least part of the image until no FPS value is received or the FPS value does not correspond to the designated condition. The electronic device may store at least part of an image displayed from the time the FPS value corresponds to the condition to the time the application is ended. The electronic device may store at least part of an image displayed from the time the FPS value corresponds to the designated condition to the time the user inputs an explicit storage end command. When the electronic device stores an application execution image in a video form, the electronic device may also store information on an image, a sound, and vibrations of the run application, or may store the application execution image in a screen shot form.

According to another embodiment of the present disclosure, the electronic device may store detection information on the time the FPS value corresponds to the designated condition. The detection information may include the time when the FPS value corresponds to the designated condition, input information on the time the FPS value corresponds to the designated value, and information on internal data throughput of the electronic device. The detection information may be stored in a file form along with the image or may be stored in a metafile form separately from the image.

When it is determined that the FPS value does not satisfy the designated value, the method returns to step 1020.

Figure 11:
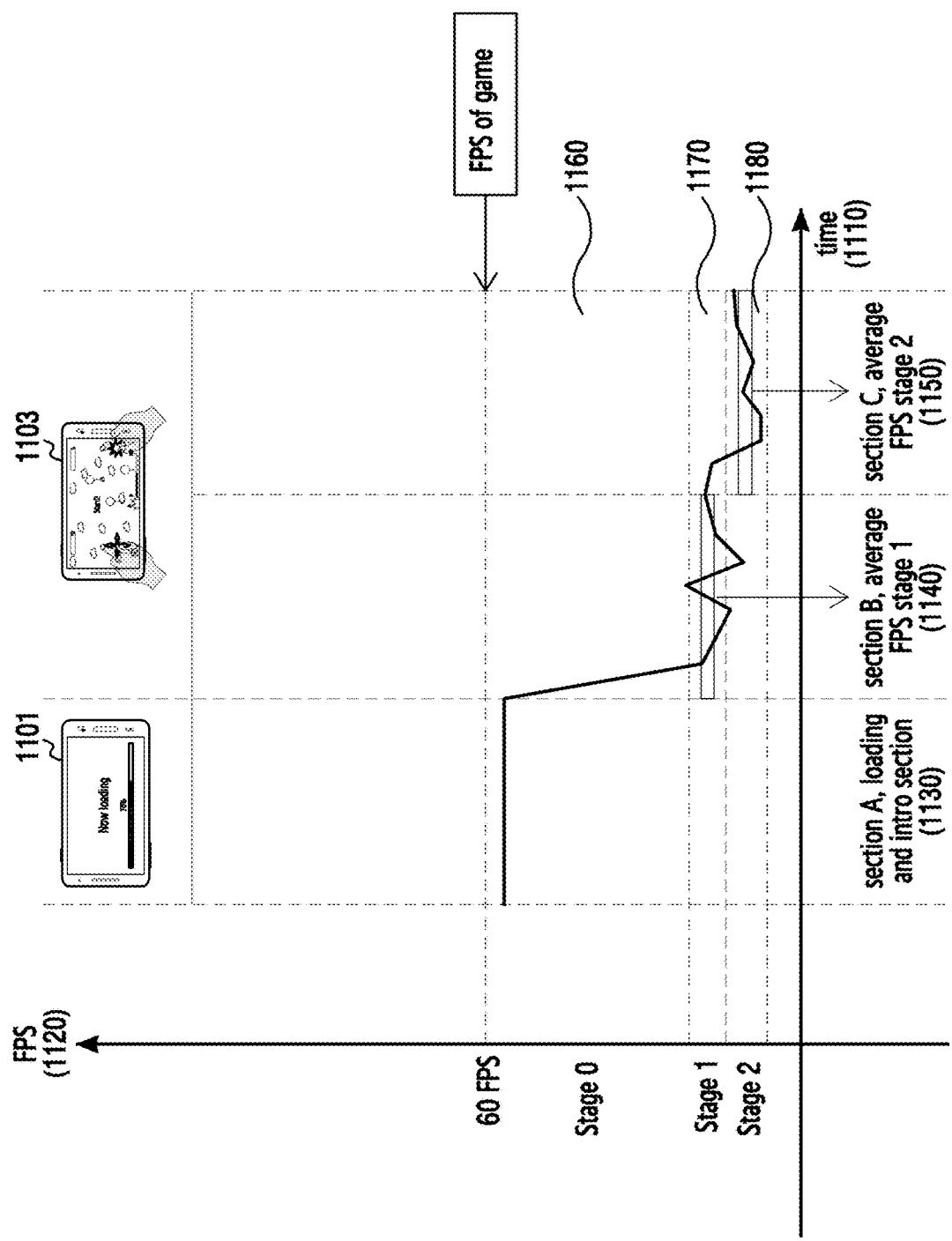
FIG. 11 illustrates a pattern of frames per unit of time according to application running time in an electronic device according to embodiments of the present disclosure.

FIG. 11 illustrates a pattern of frames per unit of time according to application running time in an electronic device according to embodiments of the present disclosure.

In particular, FIG. 11 illustrates a graph representing a change in an FPS value according to application running time when the electronic device detects the FPS value in step 1020 of FIG. 10. The example of FIG. 11 may illustrate a running game application. The horizontal axis in FIG. 11 may represent time 1110 according to the running of the application, and the vertical axis in FIG. 11 may represent an FPS value 1120. The horizontal axis in FIG. 11 may be divided into sections according to a criterion, such as a loading and intro section A 1130, and an actual application (which may be a game application in the example of FIG. 9) running section, which includes sections B 1140 and C 1150. Each unit section may be configured to include at least one or more units of time. Accordingly, the horizontal axis in FIG. 11 may be divided into sections A 1130, B 1140, and C 1150 according to a unit of time.

The electronic device may set levels 1160, 1170, and 1180 according to a system input count in order to determine whether the FPS value corresponds to the designated condition in step 1030 of FIG. 10. For example, the electronic device may define when the FPS value is greater than 30 FPS and is less than or equal to 60 FPS as stage 0 1160, may define when the FPS value is greater than 20 FPS and is less than or equal to 30 FPS as stage 1 1170, and may define when the FPS value is less than or equal to 20 FPS as stage 2 1180.

In order to determine whether a calculated input value corresponds to a designated value, the electronic device may use the average value per unit of time measured in a unit section, the peak value of per unit of time measured in a unit section, or the like. For example, the electronic device may determine whether the average of FPS values in each unit section is in the range of each of the stages 1160, 1170, and 1180. Alternatively, the electronic device may determine whether the peak value of FPS values in a unit section is in the range of each of the stages 1160, 1170, and 1180. When the electronic device determines whether the average of FPS values per unit of time corresponds to the designated value, each stage according to a unit section in FIG. 11 is illustrated in Table 2, as follows.

TABLE 2

| Unit section | Stage |
|---|---|
| A | Stage 0 |
| B | Stage 1 |
| C | Stage 2 |

As illustrated in Table 2 in relation to FIG. 11, a stage in which the FPS input count per unit of time is greater than 30 FPS and is less than or equal to 60 FPS as stage 0 1160 at unit section A, a stage in which the FPS input count per unit of time is greater than 20 FPS and is less than or equal to 30 FPS as stage 1 1170 at unit section B, and a stage in which the FPS input count per unit of time is less than or equal to 20 FPS as stage 2 1180 at unit section C.

Referring to section B 1140 in Table 2, since the average of FPS input counts per unit of time ranges between 20 FPS to 30 FPS in section B 1140, section B 1140 may correspond to stage 1 1170 in which the FPS value per unit of time is greater than 20 FPS and is less than or equal to 30 FPS.

In section A 1130 in FIG. 11, in which the application run by the electronic device is currently loading 1101, a difference between the FPS value of the electronic device and the FPS value of the application may not be significant. In section A 1130, since the processor has a relatively low throughput, a relatively high FPS value may be detected. Section B 1140 and section C 1150 in FIG. 11 may be the time the electronic device displays a screen 1103 involving a high throughput as the application is running, in which a relatively low FPS value may be detected.

The electronic device may determine whether to store an image according to a stage of each section. For example, when a stage corresponding to stage 1 1170 is a designated reference value, the electronic device may store at least part of an image in section B 1140. Alternatively, when a stage corresponding to stage 2 1180 is the designated reference value, the electronic device may store at least part of an image in section C 1150.

According to embodiments of the present disclosure, when the electronic device stores an image displayed during the time the FPS value is less than or equal to the designated value, if stage 1 1170 is a designated reference value, the electronic device may store at least part of an image from section B 1140 to section C 1150. When the electronic device stores an image displayed from the time the FPS value is less than or equal to the designated value to the time the application is ended, if stage 1 1170 is a designated reference value, the electronic device may store at least part of an image from section B 1140 to the time the running application is ended.

Figure 12:
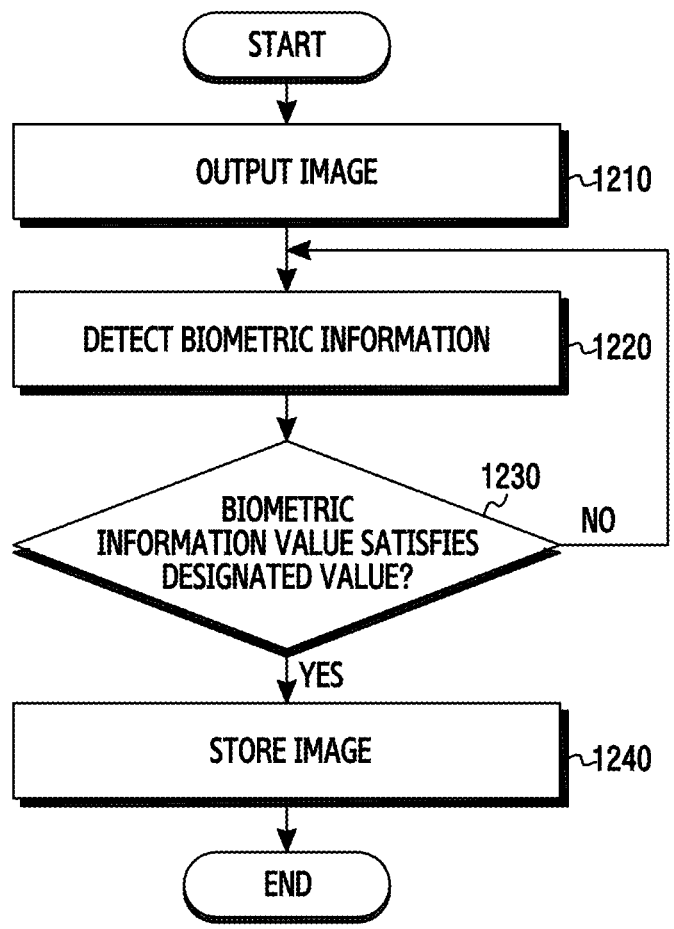
FIG. 12 illustrates an image storing procedure according to biometric input information according to embodiments of the present disclosure.

FIG. 12 illustrates an image storing procedure according to biometric input information according to embodiments of the present disclosure.

In step 1210, an electronic device may output an image according to the reception of a user input for image output, such as an input for running an application. For example, the electronic device may output an image at least based on a user input for running a video, image viewer, or game application.

In step 1220, the electronic device may detect biometric input information on the user through a biometric sensor of the electronic device or another electronic device connected to the electronic device. The biometric input information may be information that the electronic device collects to detect a reaction of the user while the application is running. The biometric input information may include information on any of the electrocardiogram, heartbeat, pulse, pupils, and a look (or expression) of a face of the user.

According to embodiments, when the electronic device uses the information on the electrocardiogram of the user among the biometric input information, the electronic device may use information on an electrocardiogram pattern. When the electronic device uses the information on the heartbeat or pulse of the user among the biometric input information, the electronic device may use information on the heart rate or pulse rate. When the electronic device uses the information on the pupils among the biometric input information, the electronic device may use information on the extent to which the pupils are enlarged. When the electronic device uses the information on the eye movement of the user among the biometric input information, the electronic device may use information on a change in the direction of the focus or a movement of the look (or expression) of the face of the user. In one embodiment of the present disclosure, the electronic device may use a biometric input information sensor and a camera of the electronic device or of another electronic device connected to the electronic device in order to detect the biometric input information.

In step 1230, the electronic device may determine whether a value of the biometric input information corresponds to a designated condition. According to embodiments, the electronic device may determine a biometric input value at a specific point of the application is greater than or equal to a designated value. The electronic device may determine whether a changing value of a biometric information input per unit of time with respect to a portion related to a specific point of the application is greater than or equal to a designated value. The electronic device may determine whether a biometric information value corresponds to a designated condition by comparing a detected biometric input value with a designated reference condition. When the electronic device detects the electrocardiogram of the user as the biometric input information, the electronic device may determine the extent to which a pattern of the detected electrocardiogram deviates from a designated pattern to compare the pattern of the electrocardiogram with a reference condition. When the electronic device detects information on the heartbeat or pulse of the user as the biometric input information, the electronic device may determine the extent to which the detected heart rate or pulse rate deviates from a designated value to compare the heart rate or pulse rate with a reference condition. When the electronic device detects information on the pupils of the user as the biometric input information, the electronic device may determine the extent to which the detected size of the pupils is enlarged as compared with a designated value to compare the size with a reference condition. When the electronic device detects the look (or expression) of a face of the user as the biometric input information, the electronic device may detect the type of the look of the face of the user to compare the type with a reference condition.

When it is determined that the detected value of the biometric input information corresponds to a designated value in step 1230, the electronic device may store at least part of an application execution image at the determination time in step 1240. According to one embodiment, the electronic device may store the application execution image in a video form. When the electronic device stores the application execution image in the video form, if a biometric input value corresponds to a designated condition, the electronic device may begin to store at least part of the output image in one embodiment. The electronic device may store at least part of an image displayed from the time a biometric information value is greater than or equal to a designated value to the time the biometric information value is changed to less than or equal to the designated value. When the electronic device stores the application execution image in the video form, the electronic device may store at least part of an image displayed from the time a biometric information value is greater than or equal to a designated value to the time the application is ended in another embodiment. When the electronic device stores the application execution image in the video form, the electronic device may store at least part of an image displayed from the time a biometric information value is greater than or equal to a designated value to the time the user inputs an explicit storage end command, and may also store information on an image, a sound, and vibrations of the application. When the electronic device stores the application execution image in the video form, the electronic device may store the application execution image in a screen shot form in another embodiment.

When it is determined that the detected value of the biometric input information does not correspond to a designated value in step 1230, the electronic device returns to step 1220.

Figure 13:
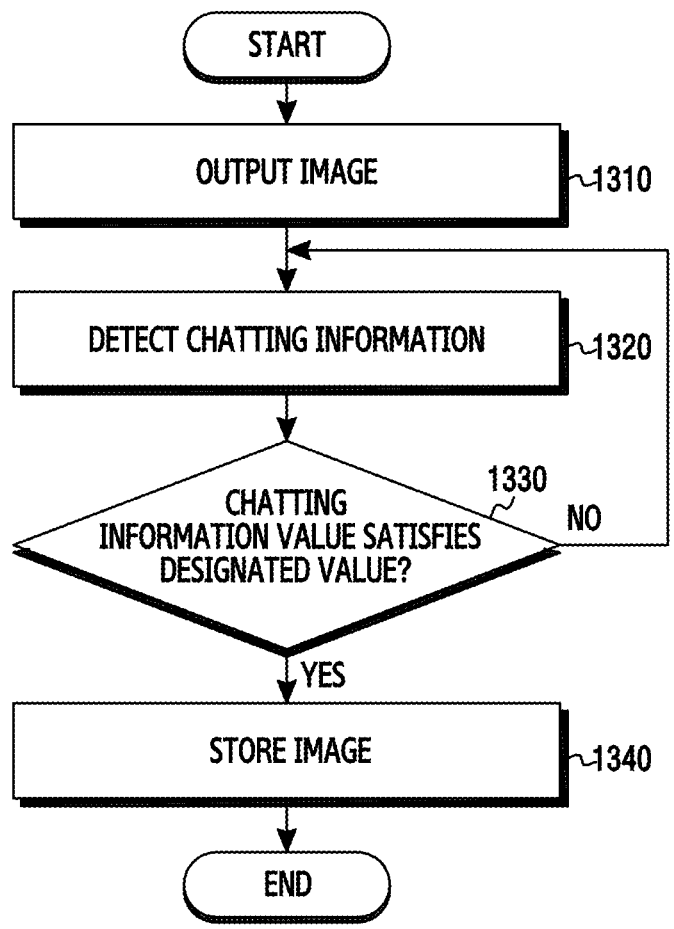
FIG. 13 illustrates an image storing procedure according to chatting input information according to embodiments of the present disclosure.

FIG. 13 illustrates an image storing procedure according to chatting input information according to embodiments of the present disclosure.

In step 1310, an electronic device may run an application. The electronic device may output an image, a sound, or vibrations provided by the application according to the running of the application. In embodiments, the electronic device may run a game application, or may run an application that provides an interface for a chatting input or an interface to display chatting.

In step 1320, the electronic device may detect chatting information, such as information on a chat exchanged between the user and another user through a chatting window provided by the application while the application is running.

In step 1330, the electronic device may determine whether a value of the chatting information corresponds to a designated value. According to embodiments, the electronic device may determine whether a chatting information value at a specific point of the application is greater than or equal to a designated value. The electronic device may determine whether a changing value of chatting quantity per unit of time with respect to a portion related to a specific point of the application is greater than or equal to a designated value. The electronic device may determine whether the chatting information includes a designated word.

The electronic device may compare the detected chatting information with a designated reference condition. In embodiments, when greater than or equal to an average quantity of chatting or occurs on a chatting window or greater than or equal to a designated level of chatting quantity occurs, the electronic device may determine the value of the chatting information corresponds to the designated condition. When a specific word is used on a chatting window, the electronic device may determine the value of the chatting information corresponds to the designated condition. For example, when a game character, a game item, a special event, a curse word, or a designated word is detected on the chatting window, the electronic device may determine that the specific word is used, thus determining the value of the chatting information corresponds to the designated condition.

In step 1340, the electronic device may store at least part of an application execution image when it is determined that the detected chatting information corresponds to the designated condition in step 1330. According to embodiments, the electronic device may store the application execution image in a video form, and may store at least part of the output image from the time the quantity of chatting information is greater than or equal to a designated quantity to the time the quantity of chatting information is changed to less than or equal to the designated quantity. When the electronic device stores the application execution image in the video form, the electronic device may store at least part of an image displayed from the time a chatting information value is greater than or equal to a designated value to the time the application is ended. When the electronic device stores the application execution image in the video form, the electronic device may store at least part of an image displayed from the time a chatting information value is greater than or equal to a designated value to the time the user inputs an explicit storage end command. When the electronic device stores the application execution image in the video form, the electronic device may also store information on an image, a sound, and vibrations of the run application. When the electronic device stores the application execution image in the video form, the electronic device may store the application execution image in a screen shot form.

When it is determined that the chatting information value does not correspond to a designated value in step 1330, the electronic device returns to step 1320.

Figure 14:
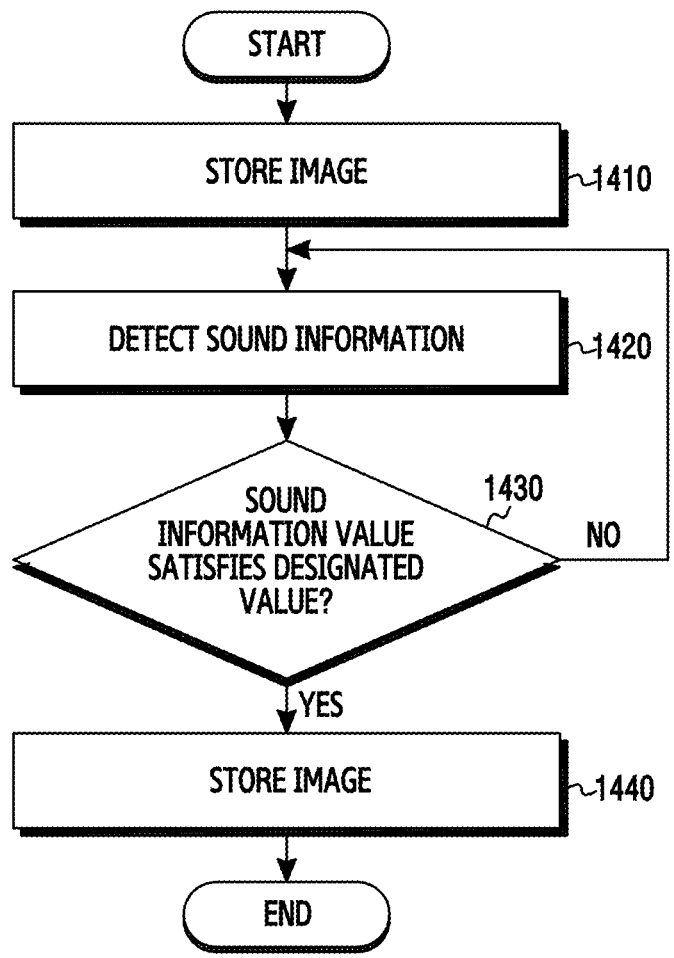
FIG. 14 illustrates an image storing procedure according to sound input information according to embodiments of the present disclosure.

FIG. 14 illustrates an image storing procedure according to sound input information according to embodiments of the present disclosure.

In step 1410, an electronic device may run an application. The electronic device may output an image, a sound, or vibrations provided by the application according to the running of the application, such as a game application.

In step 1420, the electronic device may detect sound information, such as through a microphone of the electronic device or another electronic device connected to the electronic device via a cable/wirelessly. The other electronic device may include an electronic device, such as a wearable device. The sound information may include information on a sound generated outside the electronic device or a sound generated in the electronic device while the application is running According to embodiments, the information on the sound may include a user's voice, a sound generated when the user performs an input to the electronic device to manipulate the application, a cheer made by those around the user, or an application sound output with the application running.

In step 1430, the electronic device may determine whether the sound information corresponds to a designated condition. According to embodiments, the electronic device may determine that a sound level at a specific point of the application is greater than or equal to a designated value. The electronic device may determine whether a changing value of sound quantity generated per unit of time with respect to a portion related to a specific point of the application is greater than or equal to a designated value. The electronic device may determine whether a sound includes a designated word. For example, when a sound of a voice-operated command is detected or a sound of a voice-defined event is detected, the electronic device may determine that the sound corresponds to the designated condition.

The electronic device may compare the detected sound information with a designated reference condition. According to embodiments, when the level of a detected sound is greater than or equal to an average value or a sound louder than a designated level is detected, the electronic device may determine that the sound information corresponds to the designated condition. For example, when a sound of a designated level or greater is detected outside the electronic device or a sound from a running application of a designated level or greater is detected, the electronic device may determine that a value of the sound information corresponds to a designated value.

When detected sound quantity is greater than or equal to an average value or the sound quantity detected per unit of time is greater than or equal to a designated value, the electronic device may determine that the value of the sound information corresponds to the designated value. For example, when a user's voice is continuously detected during a unit of time or a sound from a running game application is continuously detected during a unit of time, the electronic device may determine that the sound quantity detected during the unit of time is greater than or equal to a designated value. In another embodiment, when a specific sound is detected, the electronic device may determine that the sound information corresponds to the designated condition. For example, when a user's voice or an exclamation or cheer made by people in the general vicinity of the device is detected, the electronic device may determine that the sound information corresponds to the designated condition.

In step 1440, the electronic device may store at least part of an application execution image when it is determined that a detected sound information value is greater than or equal to a designated value, that the sound information value corresponds to the designated value, that the sound information value is greater than or equal to the designated value, or that the sound information value corresponds to the designated value in step 1430.

According to embodiments, the electronic device may store the application execution image in a video form, and may store at least part of the image from the time the sound information value is greater than or equal to the designated value to the time the sound information value is changed to less than or equal to the designated value. The electronic device may store at least part of the image from the time the sound information value corresponds to the designated value to the time the sound information value does not correspond to the designated value. When the electronic device stores the application execution image in the video form, the electronic device may store at least part of an image displayed from the time the sound information value is greater than or equal to the designated value or corresponds to the designated value to the time the application is ended. When the electronic device stores the application execution image in the video form, the electronic device may store at least part of an image displayed from the time the sound information value is greater than or equal to the designated value or the sound information value corresponds to the designated value to the time the user inputs an explicit storage end command. When the electronic device stores the application execution image in the video form, the electronic device may also store information on an image, a sound, and vibrations of the run application, or may store the application execution image in a screen shot form.

When it is determined that the sound information value does not correspond to a designated value in step 1430, the electronic device returns to step 1420.

Figure 15:
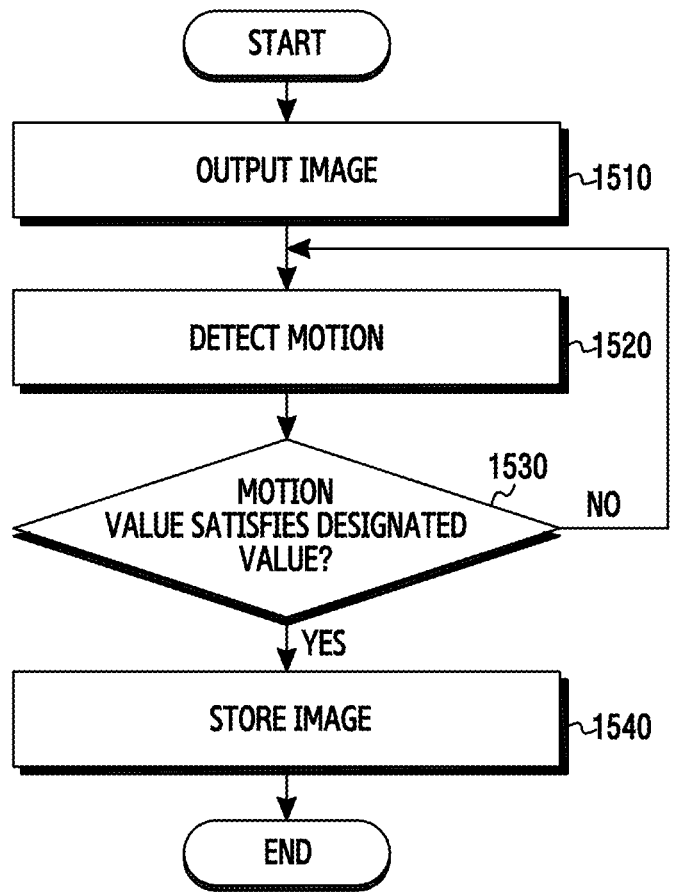
FIG. 15 illustrates an image storing procedure according to motion input information on a user according to embodiments of the present disclosure.

FIG. 15 illustrates an image storing procedure according to motion input information on a user according to embodiments of the present disclosure.

In step 1510, an electronic device may run an application. The electronic device may output an image, a sound, or vibrations provided by the application according to the running of the application, such as a game application.

In step 1520, the electronic device may detect motion information on a user through a sensor of the electronic device or another electronic device connected to the electronic device via a cable/wirelessly. The other electronic device may include an electronic device, such as a wearable device and an electronic accessory. The motion information on the user may include information on a motion of a specific body part or the entire body of the user of the electronic device while the application is running.

In step 1530, the electronic device may determine whether the motion information on the user corresponds to a designated condition. According to embodiment, the electronic device may determine that a user motion value at a specific point of the application is greater than or equal to a designated value. For example, when a motion of the user increases the electronic device may determine that the motion value is greater than or equal to the designated value. The electronic device may determine whether a changing value of a user motion level detected per unit of time with respect to a portion related to a specific point of the application is greater than or equal to a designated value. The electronic device may determine whether the motion information on the user corresponds to a designated condition. For example, when a specific posture of the user is detected, the electronic device may determine that the motion information on the user corresponds to the designated condition.

In step 1540, the electronic device may store at least part of an application execution image when it is determined that a detected user motion information value is greater than or equal to a designated value or that the user motion information value corresponds to the designated value. According to embodiments, the electronic device may store the application execution image in a video form, and may store at least part of the image from the time the user motion information value is greater than or equal to the designated value to the time the user motion information value is changed to less than or equal to the designated value. The electronic device may store at least part of the image from the time the user motion information value corresponds to the designated value to the time the user motion information value does not correspond to the designated value. When the electronic device stores the application execution image in the video form, the electronic device may store at least part of an image displayed from the time the user motion information value is greater than or equal to the designated value or corresponds to the designated value to the time the application is ended. When the electronic device stores the application execution image in the video form, the electronic device may store at least part of an image displayed from the time the user motion information value is greater than or equal to the designated value or the user motion information value corresponds to the designated value to the time the user inputs an explicit storage end command. When the electronic device stores the application execution image in the video form, the electronic device may also store information on an image, a sound, and vibrations of the run application, or may store the application execution image in a screen shot form.

When it is determined that the motion value does not correspond to a designated value in step 1530, the electronic device returns to step 1520.

When an application outputs a specific image, the electronic device may store at least part of the image of the application, such as at least part of an image displayed when a stage is cleared, a critical hit occurs, a specific character appears or disappears, a level increases, a specific element reaches a specific criterion, or a designated event occurs in a game application while the game application is running. Alternatively, the electronic device may store at least part of an image displayed when a screen displays a specific letter, such as by selecting a letter area or masking an area other than the letter area to recognize a significant letter change on the screen.

Figure 16:
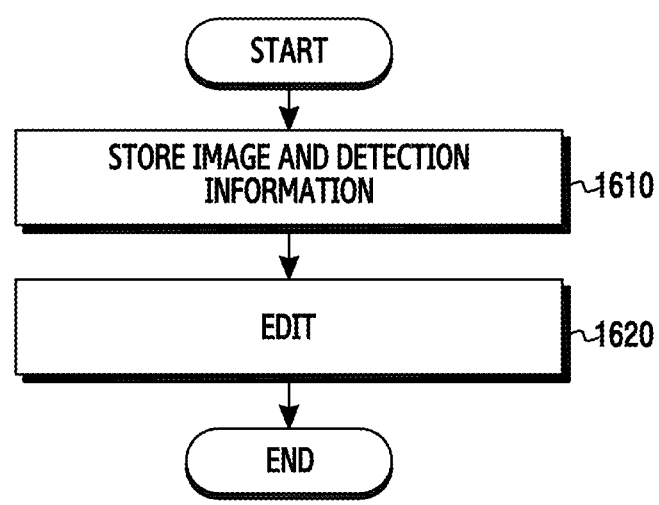
FIG. 16 illustrates a procedure for editing a stored image according to embodiments of the present disclosure.

FIG. 16 illustrates a procedure for editing a stored image according to embodiments of the present disclosure.

An electronic device may store at least part of an image according to the procedures of FIGS. 4, 7, 10, 12, 13, 14, and 15 and may edit the stored image. In step 1610 of FIG. 16, the electronic device may store an image of an application or information on the image. When the electronic device stores the image according to the procedures of the above-referenced figures, the electronic device may store detection information on the image, along with the image, in an image file or in a metafile separate from the image file. The information on the image may include input information detection information at the storage of the image, FPS information at the storage of the image, sensor information, or screen shot information.

In step 1620, the electronic device may edit the image using the image and the detection information on the image, by displaying an image editing interface on a display to provide the editing interface to the user. When the electronic device provides the user with the image editing interface, the electronic device may display the image and the detection information on the image. When the electronic device displays the image editing interface, the image, and the detection information on the image and the user performs an input for editing, the electronic device may edit the image according to the input for editing by the user.

Figure 17:
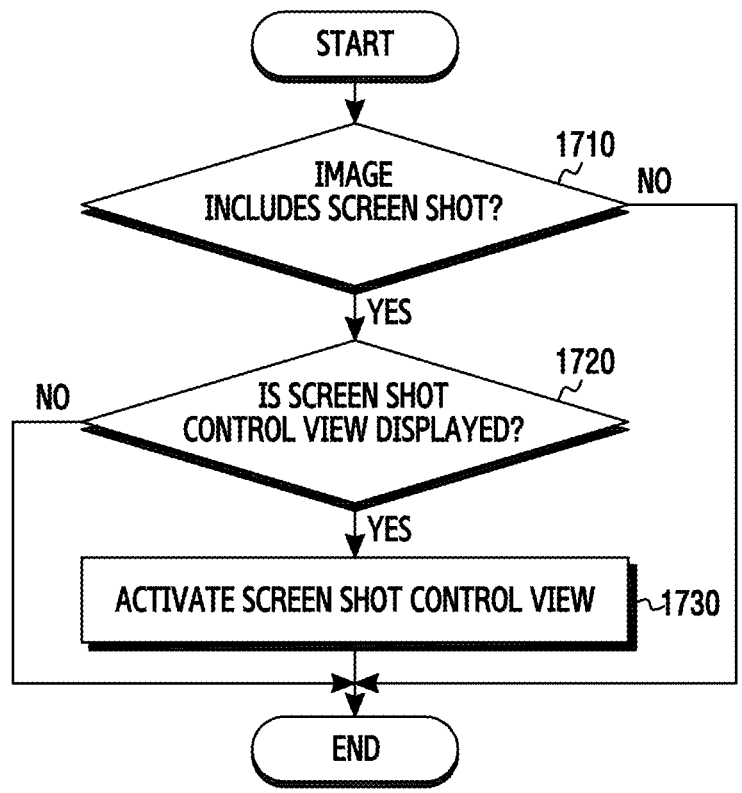
FIG. 17 illustrates a screen shot view activation procedure according to embodiments of the present disclosure.

FIG. 17 illustrates a screen shot view activation procedure according to embodiments of the present disclosure.

When an electronic device reproduces a specific image, the electronic device may display a screen shot control view on a screen to simplify a search for an image section. When the image is reproduced, the screen shot control view may include information on section length and information on a screen shot corresponding to an image section.

When the specific image is reproduced, the electronic device may determine whether the image includes a screen shot in step 1710. When the specific image includes a screen shot, the electronic device may determine whether a screen shot control view is displayed in step 1720. When the specific image includes a screen shot, the specific image may be stored according to the procedures of the above-referenced figures. When it is determined that a screen shot control view is displayed, the electronic device may activate and display the screen shot control view in step 1730. When the specific image includes no screen shot in step 1710, a screen shot control view may be not activated. According to embodiments of the present disclosure, when the specific image includes no screen shot in step 1710, the electronic device may extract a screen shot using a starting frame of the image, a frame at a specific time, and a randomly extracted frame to display the screen shot on a screen shot control view.

According to embodiments of the present disclosure, the electronic device may determine whether the image includes the detection information on the image in step 1710, instead of whether the image includes a screen shot. When the image includes the detection information, the electronic device may determine whether a screen shot control view is displayed in step 1720. When the screen shot control view is displayed, the electronic device may display the screen shot control view on the screen using information on the time the image is stored.

Figure 18:
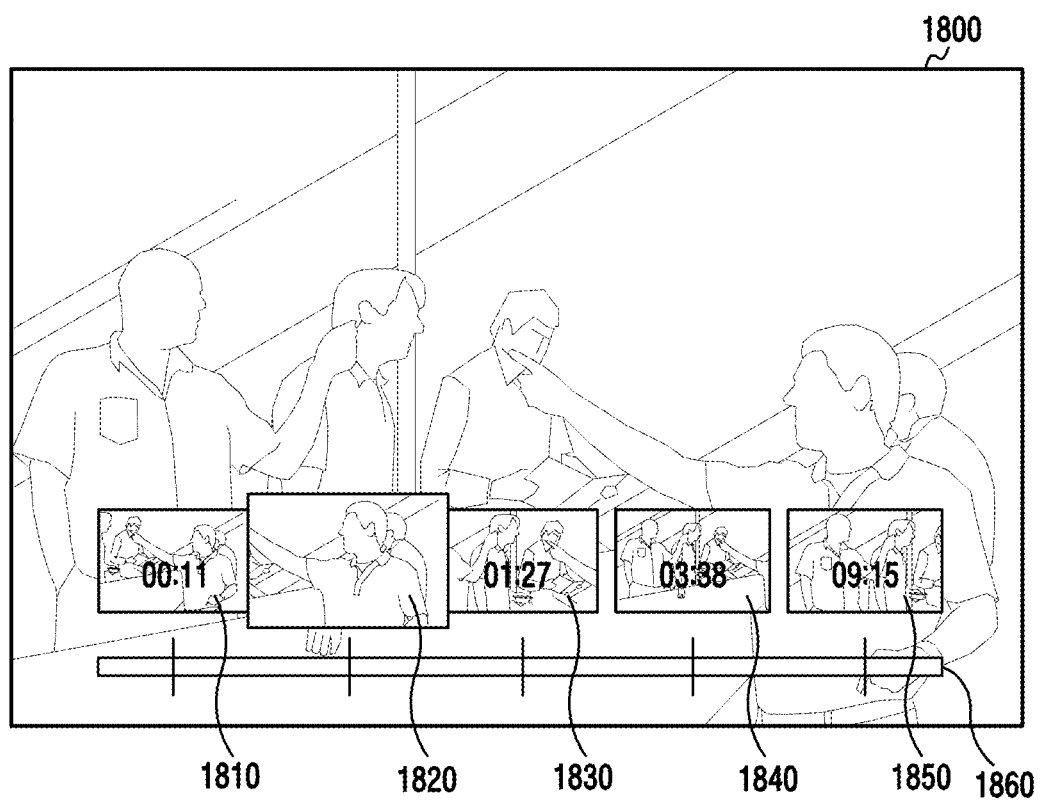
FIG. 18 illustrates a screen displaying a screen shot control view according to embodiments of the present disclosure.

FIG. 18 illustrates a screen displaying a screen shot control view according to embodiments of the present disclosure.

A screen 1800 in FIG. 18 may be displayed when a screen shot control view is activated according to step 1710, step 1720, and step 1730 in FIG. 17. When the screen shot control view is activated and displayed on the screen, the screen 1800 may display a frame of the currently reproduced screen, a bar 1860 for adjusting an image play section, and screen shots 1810, 1820, 1830, 1840, and 1850 corresponding to respective sections. According to embodiments of the present disclosure, the electronic device may display a screen shot control view using screen shot information included in an image file or a metafile associated with the image file or information on the time an image is stored. For example, when the image file or the metafile associated with the image file includes the screen shot information, the electronic device may display the screen shots 1810, 1820, 1830, 1840, and 1850 at the instance when the image is stored corresponding to corresponding positions on the bar 1860. When the image file or the metafile associated with the image file includes the information on the time the image is stored, the electronic device display the images 1810, 1820, 1830, 1840, and 1850 at the instance when the image is stored corresponding to corresponding positions on the bar 1860.

The electronic device as described above determines a time to store an image based on an input through an input unit, generates a command signal to store the image when the time to store the image is determined, and transmits the generated command signal to an external electronic device.

An image may be stored without an explicit start or end command. Only a significant portion may be extracted from an image and provided to the user. As such, a game image may be stored without an explicit start or end command while the game is being played.

Methods according to embodiments of the present disclosure may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. A plurality of such memories may be included in the electronic device.

In addition, the programs may be stored in an attachable storage device which may access the electronic device through communication networks such as the Internet, Intranet, LAN, wide LAN (WLAN), and storage area network (SAN) or a combination thereof. Such a storage device may access the electronic device via an external port. A separate storage device on the communication network may access a portable electronic device.

In the above-described detailed embodiments of the present disclosure, a component included in the present disclosure is expressed in the singular or the plural according to the disclosed embodiment. However, the singular form or plural form is selected merely for convenience of description, and embodiments of the present disclosure are not limited thereto. Either multiple elements expressed in the description may be configured into a single element or a single element in the description may be configured into multiple elements.

Although embodiments of the present disclosure have been described in the detailed description, the present disclosure may be modified in various forms without departing from the scope of the present disclosure. Therefore, the scope of the present disclosure should not be defined as being limited to the embodiments, but should be defined by the appended claims and equivalents thereof.

What is claimed is:

1. A method of an electronic device, the method comprising:

displaying, via a display of the electronic device, a user interface corresponding to an application being executed by a processor of the electronic device, wherein a time scale of the application is divided into unit sections, each unit section including at least one unit of time;

detecting one or more touch inputs;

obtaining information including a frequency of the one or more touch inputs per unit of time measured in a unit section, wherein the frequency of the one or more touch inputs is determined by counting a number of times in which the one or more touch inputs contact the user interface while the user interface is displayed;

determining whether an average or peak value of the frequency of the one or more touch inputs per unit of time measured in the unit section is greater than a designated number;

in response to determining that the average or peak value of the frequency of the one or more touch inputs per unit of time measured in the unit section is greater than the designated number, automatically storing an image including a portion of the user interface without an explicit storage start command; and in response to determining that the average or peak value of the frequency of the one or more touch inputs per unit of time measured in the unit section is not greater than the designated number, continuing to detect the one or more touch inputs without storing the image including the portion of the user interface.

2. The method of claim 1, wherein the one or more touch inputs comprise at least one of a touch input, drag input, or key input.

3. The method of claim 1, wherein the obtained information includes information associated with frames per second (FPS) related to graphics processing.

4. The method of claim 3, wherein the information associated with FPS comprises information that the FPS is less than a threshold.

5. The method of claim 1, wherein the image comprises a moving image, and wherein the application comprises at least one of a game application, a video application, and an image viewer application.

6. The method of claim 1, further comprising displaying another user interface to a user for editing the stored image.

7. The method of claim 1, wherein the image including the portion of the user interface comprises a plurality of screen shots.

8. An electronic device comprising:
a display;
a memory storing instructions; and
at least one processor is configured to execute the instructions to:

display, via the display, a user interface corresponding to an application being executed by the at least one processor, wherein a time scale of the application is divided into unit sections, each unit section including at least one unit of time;

detect one or more touch inputs;

obtain information including a frequency of the one or more touch inputs per unit of time measured in a unit section, wherein the frequency of the one or more touch inputs is determined by counting a number of times in which the one or more touch inputs contact the user interface while the user interface is displayed;

determine whether an average or peak value of the frequency of the one or more touch inputs per unit of time measured in the unit section is greater than a designated number;

in response to determining that the average or peak value of the frequency of the one or more touch inputs per unit of time measured in the unit section is greater than the designated number, automatically store an image including a portion of the user interface without an explicit storage start command; and in response to determining that the average or peak value of the frequency of the one or more touch inputs per unit of time measured in the unit section is not greater than the designated number, continue to detect the one or more touch inputs without storing the image including the portion of the user interface.

9. The electronic device of claim 8, wherein the one or more touch inputs comprise at least one of a touch input, drag input, or key input.

10. The electronic device of claim 8, wherein the obtained information includes information associated with frames per second (FPS) related to graphics processing.

11. The electronic device of claim 10, wherein the information associated with FPS comprises information that the FPS is less than a threshold.

12. The electronic device of claim 8, wherein the image comprises a moving image, and wherein the application comprises at least one of a game application, a video application, and an image viewer application.

13. The electronic device of claim 8, wherein the at least one processor is further configured to execute the instructions to display another user interface to a user for editing the stored image.

14. The electronic device of claim 8, wherein the image including the portion of the user interface comprises a plurality of screen shots.

* * * * *